US012058544B2

(12) United States Patent
Yokoyama et al.

(10) Patent No.: US 12,058,544 B2
(45) Date of Patent: Aug. 6, 2024

(54) COMMUNICATION APPARATUS, TERMINAL APPARATUS, METHOD, PROGRAM, AND RECORDING MEDIUM

(71) Applicant: NEC CORPORATION, Tokyo (JP)

(72) Inventors: Toshihiro Yokoyama, Tokyo (JP); Sadafuku Hayashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 304 days.

(21) Appl. No.: 16/968,309

(22) PCT Filed: Jan. 28, 2019

(86) PCT No.: PCT/JP2019/002638
§ 371 (c)(1),
(2) Date: Aug. 7, 2020

(87) PCT Pub. No.: WO2019/159662
PCT Pub. Date: Aug. 22, 2019

(65) Prior Publication Data
US 2021/0084515 A1    Mar. 18, 2021

(30) Foreign Application Priority Data

Feb. 13, 2018  (JP) .................................. 2018-023332

(51) Int. Cl.
*H04W 24/10*  (2009.01)
*H04W 24/08*  (2009.01)
*H04W 76/15*  (2018.01)

(52) U.S. Cl.
CPC .......... *H04W 24/10* (2013.01); *H04W 24/08* (2013.01); *H04W 76/15* (2018.02)

(58) Field of Classification Search
None
See application file for complete search history.

(56) References Cited

U.S. PATENT DOCUMENTS

2016/0165459 A1  6/2016  Takayanagi et al.
2016/0380779 A1  12/2016  Sharma et al.
(Continued)

FOREIGN PATENT DOCUMENTS

JP    2017-050900 A    3/2017
JP    2017-510162 A    4/2017
(Continued)

OTHER PUBLICATIONS

Extended European Search Report for EP Application No. EP19755053.6 dated on Feb. 16, 2021.
(Continued)

*Primary Examiner* — Chi H Pham
*Assistant Examiner* — Raul Rivas
(74) *Attorney, Agent, or Firm* — Sughrue Mion, PLLC

(57) ABSTRACT

In order to enable reporting of data volume from a secondary node (SN) to a master node (MN) in dual connectivity, a communication apparatus according to the present invention includes: an information obtaining unit configured to obtain data volume information indicating volume of data transmitted between a first base station and a terminal apparatus, the first base station operating for the terminal apparatus as a secondary node of dual connectivity using at least New Radio (NR); and a communication processing unit configured to transmit the data volume information to a second base station operating for the terminal apparatus as a master node of the dual connectivity. The volume of the data is data volume counted in a Packet Data Convergence Protocol (PDCP) layer or between the PDCP layer and a Radio Link Control (RLC) layer.

16 Claims, 21 Drawing Sheets

(56) References Cited

U.S. PATENT DOCUMENTS

| | | | |
|---|---|---|---|
| 2017/0164177 A1* | 6/2017 | Wang | H04M 15/58 |
| 2017/0245184 A1* | 8/2017 | Nagesh Shetigar | H04J 11/00 |
| 2017/0332431 A1* | 11/2017 | Kim | H04W 72/51 |
| 2018/0049208 A1* | 2/2018 | Ozturk | H04W 72/0486 |
| 2018/0124648 A1* | 5/2018 | Park | H04W 36/0005 |
| 2018/0220326 A1* | 8/2018 | Nagasaka | H04W 28/0278 |

FOREIGN PATENT DOCUMENTS

| | | |
|---|---|---|
| JP | 2017-532801 A | 11/2017 |
| WO | 2015/008552 A1 | 1/2015 |
| WO | 2016/033810 A1 | 3/2016 |

OTHER PUBLICATIONS

Huawei, "Secondary RAT data volume reporting", 3GPP Draft; R3-173923, 3GPP TSG RAN WG3 Meeting #97bis, Oct. 9, 2017, Czech.

Qualcomm Incorporated: "F1-U Fast Retransmission", 3GPP Draft; R3-173748, 3GPP TSG RAN WG3 Meeting #97bis, Oct. 9, 2017, Czech.

Japanese Office Action for JP Application No. 2020-500371 mailed on Oct. 19, 2021 with English Translation.

ZTE, "Miscellaneous corrections", 3GPP TSG RAN WG2 adhoc_2018_01_NR, R2-1801617, Jan. 27, 2018, Canada.

Ericsson, "Dual Connectivity deployment options and relation to XnUP/X2UP/F1UP", 3GPP TSG RAN WG3 adhoc_R3_AH_NR_1706, R3-172549, Jun. 27, 2017, China.

International Preliminary Report on Patentability dated Aug. 18, 2020 from the International Bureau in International Application No. PCT/JP2019/002638 with Written Opinion dated Apr. 16, 2019.

3GPP TS 37.340 V15.0.0 (Dec. 2017), "3rd Generation Partnership Project; Technical 25 Specification Group Radio Access Network; Evolved Universal Terrestrial Radio Access (E-UTRA) and NR; Multi-connectivity; Stage 2 (Release 15)".

3GPP TS 36.423 V15.0.0 (Dec. 2017), "3rd Generation Partnership Project; Technical Specification Group Radio Access Network; Evolved Universal Terrestrial Radio Access Network (E-UTRAN); X2 application protocol (X2AP) (Release 15)".

Huawei, 3GPP TSG RAN WG3 #98 R3-174931, "Stage 3 for secondary RAT data volume reporting over X2," Dec. 2017.

NTT Docomo, Inc., 3GPP TSG RAN WG3 #98 R3-174903, "Clarification on desired buffer size," Dec. 2017.

Huawei, 3GPP TSG RAN WG3 #98 R3-174930, "Stage 2 for secondary RAT data volume reporting," Dec. 1, 2017.

International Search Report for PCT/JP2019/002638 dated Apr. 16, 2019 [PCT/ISA/210].

Written Opinion for PCT/JP2019/002638 dated Apr. 16, 2019 [PCT/ISA/237].

Japanese Office Action for JP Application No. 2020-500371 mailed on May 10, 2022 with English Translation.

JP Office Action for JP Application No. 2022-195720, mailed on Oct. 24, 2023 with English Translation.

Huawei, (TP for NR BL CR for TS 37.340) Data Volume Reporting in 5GC[online], 3GPP TSG RAN WG3 #102 R3-187038, Internet<URL:https://www.3gpp.org/ftp/tsg_ran/WG3_lu/TSGR3_102/Docs/R3-187038.zip>, Nov. 16, 2018.

Huawei, Clarification on secondary RAT data volume reporting[online], 3GPP TSG RAN WG3 adhoc_R3-AH-1807 R3-184241, Internet<URL:https://www.3gpp.org/ftp/tsg_ran/WG3_lu/TSGR3_AHGs/R3-AH-1807/Docs/R3-184241.zip>, Jul. 6, 2018.

* cited by examiner

| IE/Group Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE X2AP ID 9.2.24 | Allocated at the MeNB | YES | reject |
| SgNB UE X2AP ID | M | | en-gNB UE X2AP ID 9.2.100 | Allocated at the en-gNB | YES | reject |
| Secondary RAT Usage Report list | M | | 9.2.120 | | YES | ignore |

FIG. 11

| IE/Group Name | Presence | Range | IE type and reference | Semantics description | Criticality | Assigned Criticality |
|---|---|---|---|---|---|---|
| Secondary RAT usage report item | | 1..<maxnoofE-RABs> | | | EACH | ignore |
| >E-RAB ID | M | | 9.2.23 | | - | - |
| >Secondary RAT Type | M | | ENUMERATED (nR, ...) | | - | - |
| >E-RAB Usage Report List | | 1 | | | - | - |
| >>E-RAB Usage Report Item | | 1..<maxnoof time periods> | | | EACH | ignore |
| >>>Start timestamp | M | | OCTET STRING (SIZE(4)) | encoded in the same format as the first four octets of the 64-bit timestamp format as defined in section 6 of IETF RFC 5905 [35]. It indicates the UTC time when the recording of the Secondary RAT Data Volume was started. | - | - |
| >>>End timestamp | M | | OCTET STRING (SIZE(4)) | encoded in the same format as the first four octets of the 64-bit timestamp format as defined in section 6 of IETF RFC 5905 [35]. It indicates the UTC time when the recording of the Secondary RAT Data Volume was ended. | - | - |
| >>>Usage count UL | M | | INTEGER | The unit is octets. | - | - |
| >>>Usage count DL | M | | INTEGER | The unit is octets. | - | - |

FIG. 12

COMMUNICATION APPARATUS, TERMINAL APPARATUS, METHOD, PROGRAM, AND RECORDING MEDIUM

CROSS REFERENCE TO RELATED APPLICATIONS

This application is a National Stage of International Application No. PCT/JP2019/002638 filed Jan. 28, 2019, claiming priority based on Japanese Patent Application No. 2018-023332 filed Feb. 13, 2018.

BACKGROUND

Technical Field

The present invention relates to a communication apparatus, a terminal apparatus, a method, a program, and a recording medium.

Background Art

In Release 15 of the Third-Generation Partnership Project (3GPP), E-UTRA-NR Dual Connectivity (EN-DC) is defined (see NPL 1). In EN-DC, a User Equipment (UE) is connected to one evolved Node B (eNB) operating as a master node (MN) and an en-gNB operating as a secondary node (SN).

Further, as one function of EN-DC, a Secondary RAT Data Usage Report function is defined (see NPL 2). The en-gNB counts (measures) the volume of user data transmitted between the en-gNB and the UE by using New Radio (NR) being a secondary Radio Access Technology (RAT), and reports the data volume to an MeNB (eNB being an MN) by using the X2AP: Secondary RAT Data Usage Report message.

CITATION LIST

Non Patent Literature

[NPL 1] 3GPP TS 37.340 V15.0.0 (2017-12) "3rd Generation Partnership Project; Technical Specification Group Radio Access Network; Evolved Universal Terrestrial Radio Access (E-UTRA) and NR; Multi-connectivity; Stage 2 (Release 15)"

[NPL 2] 3GPP TS 36.423 V15.0.0 (2017-12) "3rd Generation Partnership Project; Technical Specification Group Radio Access Network; Evolved Universal Terrestrial Radio Access Network (E-UTRAN); X2 application protocol (X2AP) (Release 15)"

SUMMARY

Technical Problem

However, a method of implementing the Secondary RAT Data Usage Report function has not yet been defined. More specifically, a method in which the en-gNB being an SN counts (measures) the data volume has not yet been defined.

An example object of the present invention is to provide a scheme that enables reporting of data volume from a secondary node (SN) to a master node (MN) in dual connectivity.

Solution to Problem

A first communication apparatus according to one example aspect of the present invention includes: an information obtaining unit configured to obtain data volume information indicating volume of data transmitted between a first base station and a terminal apparatus, the first base station operating for the terminal apparatus as a secondary node of dual connectivity using at least New Radio (NR); and a communication processing unit configured to transmit the data volume information to a second base station operating for the terminal apparatus as a master node of the dual connectivity. The volume of the data is data volume counted in a Packet Data Convergence Protocol (PDCP) layer or between the PDCP layer and a Radio Link Control (RLC) layer.

A second communication apparatus according to one example aspect of the present invention includes: a communication processing unit configured to receive, from a first base station operating for a terminal apparatus as a secondary node of dual connectivity using at least New Radio (NR), data volume information indicating volume of data transmitted between the first base station and the terminal apparatus. The volume of the data is data volume counted in a Packet Data Convergence Protocol (PDCP) layer or between the PDCP layer and a Radio Link Control (RLC) layer.

A terminal apparatus according to one example aspect of the present invention includes: a first communication processing unit configured to communicate with a first base station operating for the terminal apparatus as a secondary node of dual connectivity using at least NR; and a second communication processing unit configured to communicate with a second base station operating for the terminal apparatus as a master node of the dual connectivity. The first base station is configured to transmit data volume information indicating volume of data transmitted between the first base station and the terminal apparatus to the second base station. The volume of the data is data volume counted in a Packet Data Convergence Protocol (PDCP) layer or between the PDCP layer and a Radio Link Control (RLC) layer.

A first method according to one example aspect of the present invention includes: obtaining data volume information indicating volume of data transmitted between a first base station and a terminal apparatus, the first base station operating for the terminal apparatus as a secondary node of dual connectivity using at least New Radio (NR); and transmitting the data volume information to a second base station operating for the terminal apparatus as a master node of the dual connectivity. The volume of the data is data volume counted in a Packet Data Convergence Protocol (PDCP) layer or between the PDCP layer and a Radio Link Control (RLC) layer.

A second method according to one example aspect of the present invention includes: receiving, from a first base station operating for a terminal apparatus as a secondary node of dual connectivity using at least New Radio (NR), data volume information indicating volume of data transmitted between the first base station and the terminal apparatus. The volume of the data is data volume counted in a Packet Data Convergence Protocol (PDCP) layer or between the PDCP layer and a Radio Link Control (RLC) layer.

A third method according to one example aspect of the present invention includes: communicating with a first base station operating for a terminal apparatus as a secondary node of dual connectivity using at least NR; and communicating with a second base station operating for the terminal apparatus as a master node of the dual connectivity. The first base station is configured to transmit data volume information indicating volume of data transmitted between the first base station and the terminal apparatus to the second base station. The volume of the data is data volume counted in a Packet Data Convergence Protocol (PDCP) layer or between the PDCP layer and a Radio Link Control (RLC) layer.

In one example aspect of the present invention, a program for causing a processor to execute at least one of the first method, the second method, and the third method, or a non-transitory computer readable recording medium recording the program may be provided.

Advantageous Effects of Invention

According to one example aspect of the present invention, reporting of data volume from a secondary node (SN) to a master node (MN) in dual connectivity is enabled. Note that, according to one example aspect of the present invention, instead of or together with the above effects, other effects may be exerted.

BRIEF DESCRIPTION OF THE DRAWINGS

FIG. 11 is a first explanatory diagram for describing an example of a SECONDARY RAT DATA USAGE REPORT message according to a first example embodiment;

FIG. 12 is a second explanatory diagram for describing an example of a SECONDARY RAT DATA USAGE REPORT message according to the first example embodiment;

DESCRIPTION OF THE EXAMPLE EMBODIMENTS

Figure 1:
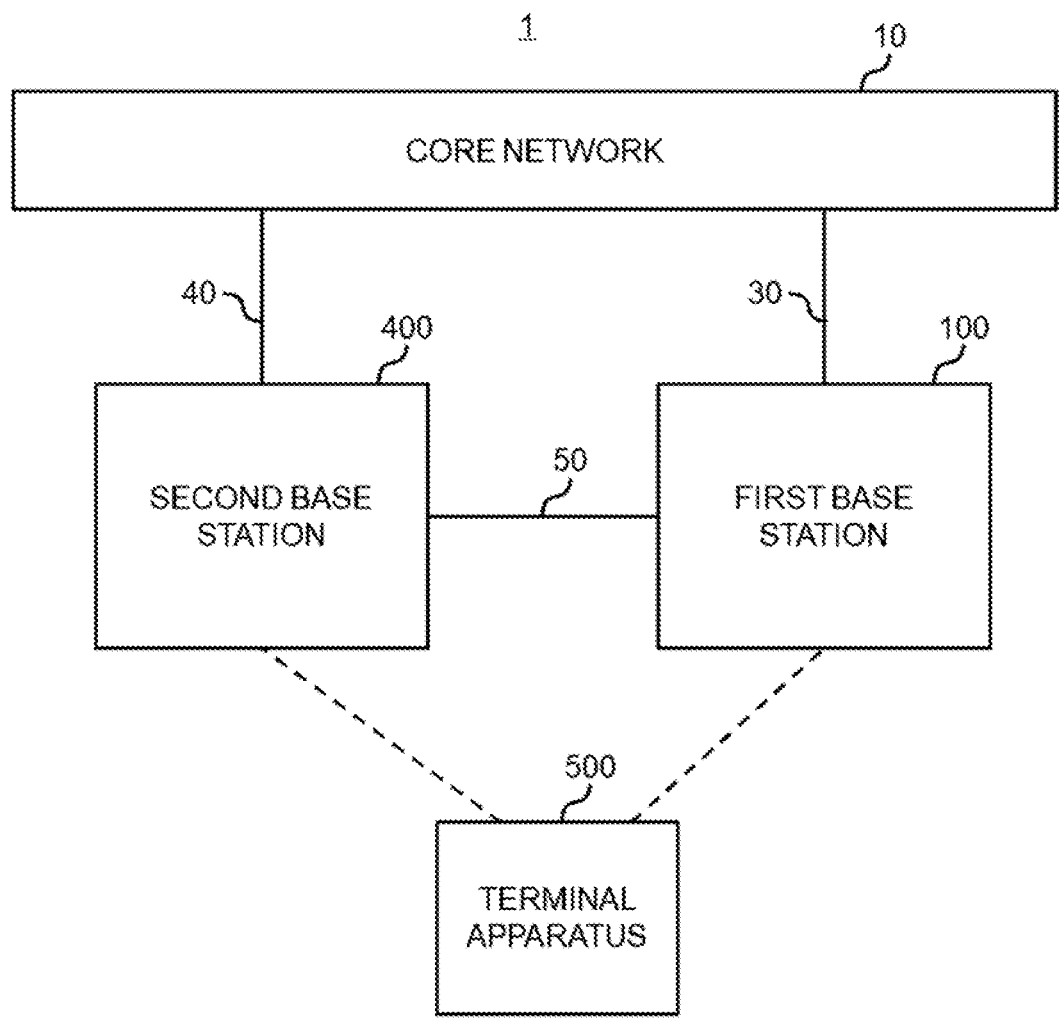
FIG. 1 is an explanatory diagram illustrating an example of a schematic configuration of a system according to an example embodiment.

Example embodiments of the present invention (hereinafter referred to as the "present example embodiment") will be described below in detail with reference to the accompanying drawings. Note that, in the Specification and drawings, elements to which similar descriptions are applicable are denoted by the same reference signs, and overlapping descriptions may hence be omitted.

Descriptions will be given in the following order.
1. Overview of Present Example Embodiment
2. Configuration of System
3. Configuration of Each Node
   3.1. Configuration of Central Unit (CU)
   3.2. Configuration of Distributed Unit (DU)
   3.3. Configuration of Second Base Station
   3.4. Configuration of Terminal Apparatus
4. First Example Embodiment
5. Second Example Embodiment
6. Example Alterations
7. Third Example Embodiment
   7.1. Configuration of First Communication Apparatus
   7.2. Configuration of Second Communication Apparatus
   7.3. Configuration of Terminal Apparatus
   7.4. Technical Features 1. Overview of Present Example Embodiment First, an overview of the present example embodiment will be described.

(1) Technical Issues

In Release 15 of 3GPP, EN-DC is defined. In EN-DC, a UE is connected to one eNB operating as a master node (MN) and an en-gNB operating as a secondary node.

Further, as one function of EN-DC, a Secondary RAT Data Usage Report function is defined. The en-eNB counts (measures) the volume of user data transmitted between the en-eNB and the UE by using New Radio (NR) being a secondary RAT, and reports the data volume to an MeNB (eNB being an MN) by using the X2AP: Secondary RAT Data Usage Report message.

However, a method of implementing the Secondary RAT Data Usage Report function has not yet been defined. More specifically, a method in which the en-gNB being an SN counts (measures) the data volume has not yet been defined.

For example, regarding data transmitted between the SN and the UE through an MN Terminated bearer (MN Terminated SCG/Split bearer), processing of the Packet Data Convergence Protocol (PDCP) layer is performed in the MN, and processing of the Radio Link Control (RLC) layer or its lower layers is performed in the SN. In contrast, regarding data transmitted between the SN and the UE through an SN Terminated bearer (SN Terminated SCG/Split bearer), both of processing of the PDCP layer and processing of the RLC layer or its lower layers are performed in the SN. In this manner, although a processing route of data is complicated, how the SN (en-gNB) counts (measures) the data volume has not yet been defined.

Note that a method in which the SN counts (measures) the data volume is required not only in EN-DC but also in other DCs such as NG-RAN E-UTRA-NR Dual Connectivity (NGEN-DC) and NR-E-UTRA Dual Connectivity (NE-DC).

(2) Technical Features

In the present example embodiment, for example, the volume of data transmitted between the first base station operating for a terminal apparatus as a secondary node (SN) of dual connectivity (DC) using at least New Radio (NR) and the terminal apparatus is counted in the PDCP layer or between the PDCP layer and the RLC layer.

The configuration described above enables, for example, reporting of the data volume from the secondary node (SN) to the master node (MN) in dual connectivity. Specifically, for example, the base station operating as an SN may be split into a central unit and a distributed unit(s), and processing of the PDCP layer is executed in the central unit (CU), irrespective of a type of the split (Higher Layer Split or Lower Layer Split). Thus, counting of the data volume in the PDCP layer or between the PDCP layer and the RLC layer may be performed by the CU that has a function of reporting the data volume to the MN. Consequently, the CU can report the counted data volume to the MN.

2. Configuration of System

With reference to FIG. 1, an example of a configuration of a system 1 according to the present example embodiment will be described. FIG. 1 is an explanatory diagram illustrating an example of a schematic configuration of the system 1 according to the present example embodiment. With reference to FIG. 1, the system 1 includes a core network 10, a first base station 100, a second base station 400, and a terminal apparatus 500.

(1) Conformity to Standards/Specifications

For example, the system 1 is a system that conforms to standards or specifications of 3GPP. More specifically, for example, the system 1 conforms to standards or specifications of the fifth generation (5G) or New Radio (NR). The system 1 may conform to standards or specifications of Long Term Evolution (LTE) or System Architecture Evolution (SAE). LTE herein may be LTE-Advanced or enhanced LTE (eLTE), may be (normal) LTE, or may be LTE of other types.

(2) Interface

The first base station 100 communicates with the core network 10 via an interface 30. The second base station 400 communicates with the core network 10 via an interface 40.

In one example, the core network 10 is an Evolved Packet Core (EPC) (that is, a core network of the Fourth-Generation (4G)). In this case, for example, the interface 30 and the interface 40 are each an S1 interface.

In another example, the core network 10 may be a Fifth-Generation Core network (5GC). In this case, the interface 30 and the interface 40 may each be an NG interface.

The first base station 100 and the second base station 400 communicate with each other via an interface 50.

(3) Dual Connectivity

The first base station 100 wirelessly communicates with the terminal apparatus 500. The second base station 400 also wirelessly communicates with the terminal apparatus 500. The terminal apparatus 500 supports dual connectivity, and for example, is simultaneously connected with the first base station 100 and the second base station 400. In particular, in the present example embodiment, the first base station 100 operates as a secondary node (SN) of dual connectivity for the terminal apparatus 500, and the second base station 400 operates as a master node (MN) of dual connectivity for the terminal apparatus 500.

In the present example embodiment, regarding the dual connectivity, at least New Radio (NR) is used as a Radio Access Technology (RAT). In other words, at least one of the master node (second base station 400) and the secondary node (first base station 100) communicates with the terminal apparatus 500 by using NR. Note that the NR is a RAT of the Fifth-Generation (5G) of 3GPP, and may be referred to as a New RAT (NR), a 5G NR (New Radio/RAT), or the like.

NR+LTE

For example, the dual connectivity is dual connectivity using NR and LTE. In other words, one of the master node (second base station 400) and the secondary node (first base station 100) communicates with the terminal apparatus 500 by using NR, and the other communicates with the terminal apparatus 500 by using LTE. As described above, LTE herein may be LTE-Advanced or enhanced LTE (eLTE), may be (normal) LTE, or may be LTE of other types.

EN-DC

In one example, the dual connectivity is EN-DC, the first base station 100 is an en-gNB, and the second base station 400 is a Master eNB (MeNB). In other words, the second base station 400 (MeNB) being a master node (MN) communicates with the terminal apparatus 500 by using LTE as a RAT, and the first base station 100 (en-gNB) being a secondary node (SN) communicates with the terminal apparatus 500 by using NR as a RAT. In this case, the core network 10 is an EPC, and the interface 50 between the first base station 100 and the second base station 400 is an X2 interface.

Figure 2:
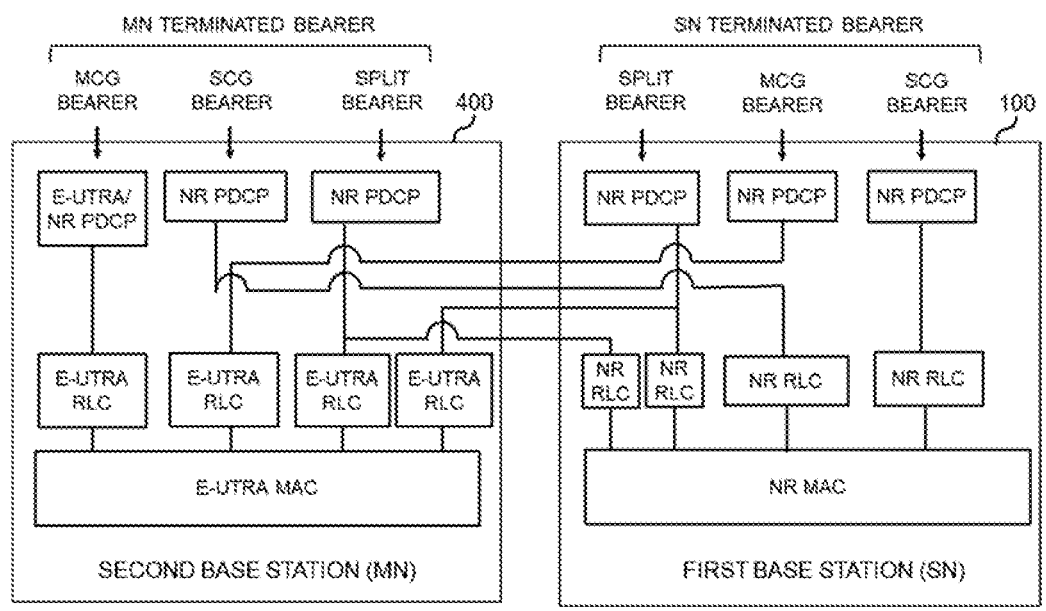
FIG. 2 is an explanatory diagram for describing an example of layer processing of each radio bearer according to the example embodiment.

FIG. 2 is an explanatory diagram for describing an example of layer processing of each radio bearer according to the present example embodiment. With reference to FIG. 2, the first base station 100 (en-gNB) being a secondary node (SN), the second base station 400 (MeNB) being a master node (MN), and their respective radio bearers are illustrated. The radio bearers include an MN Terminated bearer that is terminated at an MN (i.e., that has the PDCP located in an MN) and an SN Terminated bearer that is terminated at an SN (i.e., that has the PDCP located in an SN). Further, the MN Terminated bearer includes a Master Cell Group (MCG) bearer, a Secondary Cell Group (SCG) bearer, and a Split bearer. In a similar manner, the SN Terminated bearer includes an MCG bearer, an SCG bearer, and a Split bearer. The MCG bearer is a radio bearer having an RLC bearer only in the MCG, and processing of the RLC layer, the MAC layer, and the physical layer regarding the MCG bearer is performed in the MN (second base station 400). The SCG bearer is a radio bearer having an RLC bearer only in the SCG, and processing of the RLC layer, the MAC layer, and the physical layer regarding the SCG bearer is performed in the SN (first base station 100). The Split bearer is a radio bearer having an RLC bearer both in the MCG and the SCG, and processing of the RLC layer, the MAC layer, and the physical layer regarding the Split bearer is performed in both of the MN (second base station 400) and the SN (first base station 100).

Note that, although an example in which the dual connectivity is EN-DC has been described, the present example embodiment is not limited to this example.

NGEN-DC

In one example, the dual connectivity may be NGEN-DC, the first base station 100 may be a gNB operating as an SN, and the second base station 400 may be an ng-eNB operating as an MN. In this case, the core network 10 may be a 5GC, and the interface 50 between the first base station 100 and the second base station 400 may be an Xn interface.

NE-DC

In another example, the dual connectivity may be NE-DC, the first base station 100 may be an ng-gNB operating as an SN, and the second base station 400 may be a gNB operating as an MN. In this case, the core network 10 may be a 5GC, and the interface 50 between the first base station 100 and the second base station 400 may be an Xn interface.

NR Only

Alternatively, the dual connectivity may be dual connectivity using NR (without using LTE). In other words, both of the master node (second base station 400) and the secondary node (first base station 100) may communicate with the terminal apparatus 500 by using NR. The first base station 100 may be a gNB operating as an SN, and the second base station 400 may be a gNB operating as an MN. In this case, the core network 10 may be a 5GC, and the interface 50 between the first base station 100 and the second base station 400 may be an Xn interface.

Note that the first base station 100 may be a base station of a first operator, and the second base station 400 may be a base station of a second operator that is different from the first operator. In other words, the dual connectivity may be dual connectivity among operators.

(4) Split of First Base Station

For example, the first base station 100 includes a central unit (CU) and one or more distributed units (DUs).

Figure 3:
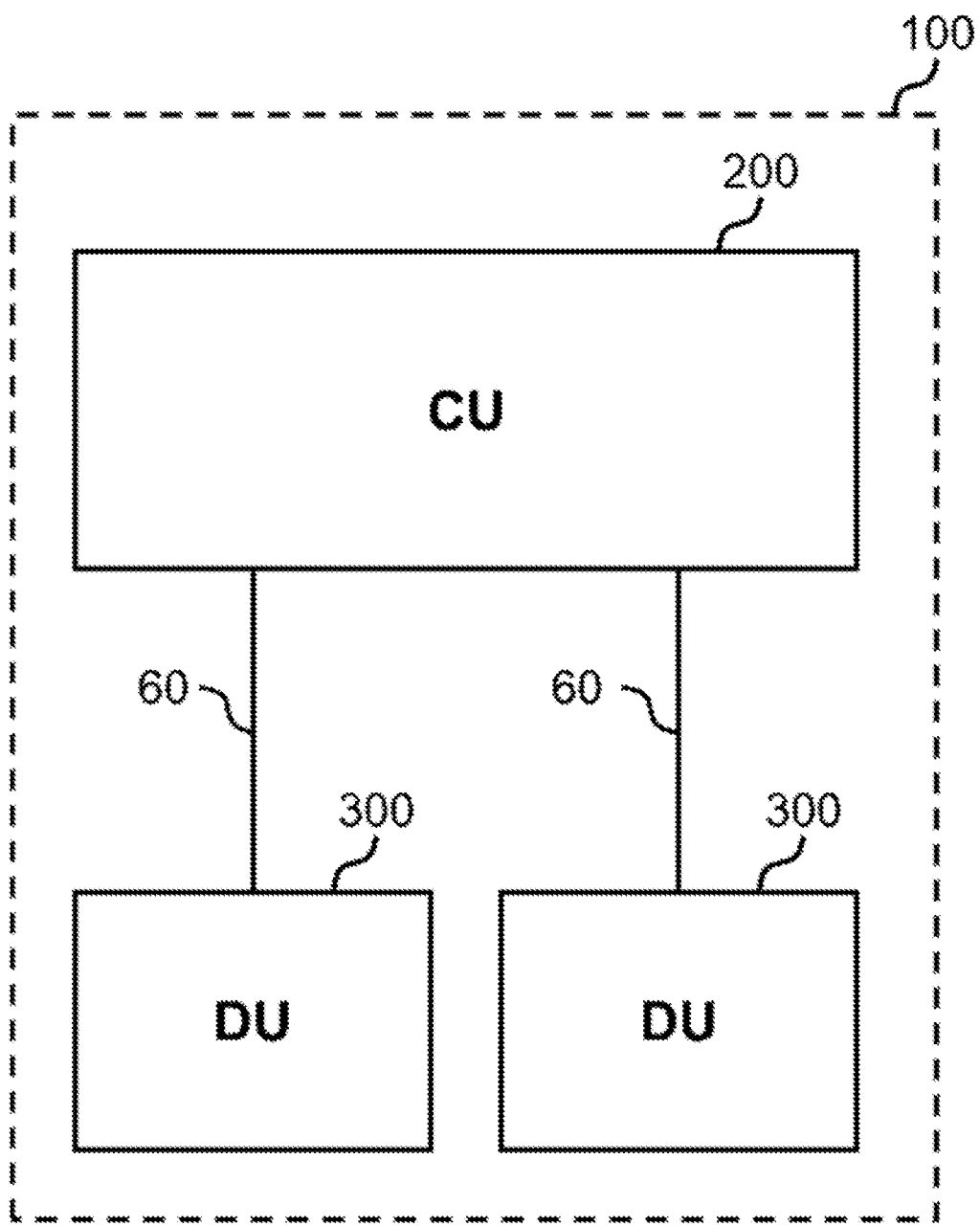
FIG. 3 is an explanatory diagram for describing an example of split of a first base station according to the example embodiment.

FIG. 3 is an explanatory diagram for describing an example of split of the first base station 100 according to the present example embodiment. With reference to FIG. 3, a central unit (CU) 200 and distributed units (DUs) 300 included in the first base station 100 are illustrated. The CU 200 and each of the DUs 300 communicate with each other via an interface 60. In this example, two DUs 300 are illustrated. However, the first base station 100 may include three or more DUs 300, or may include only one DU 300.

Higher Layer Split

For example, the first base station 100 is split by a Higher Layer Split.

Figure 4:
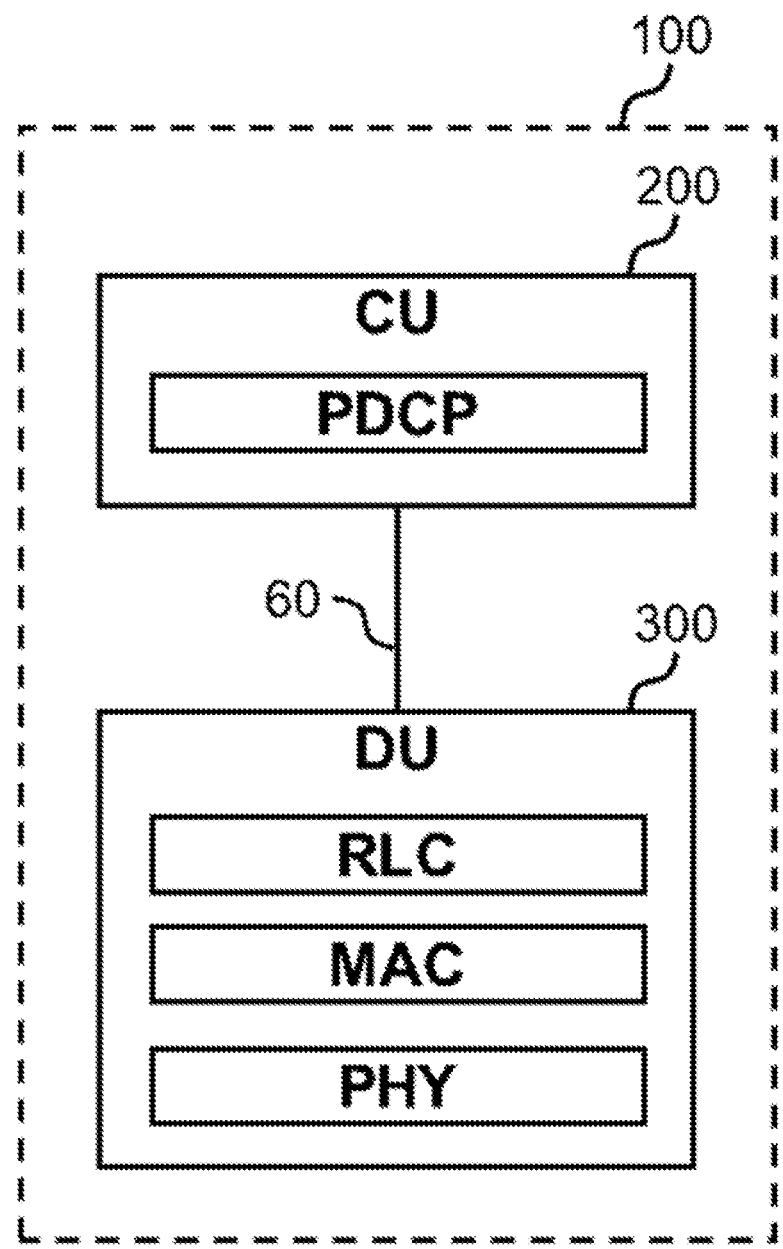
FIG. 4 is an explanatory diagram for describing a first example of split of the first base station according to the example embodiment.

FIG. 4 is an explanatory diagram for describing a first example of split of the first base station 100 according to the present example embodiment. With reference to FIG. 4, the CU 200 and the DU 300 included in the first base station 100 are illustrated. The PDCP layer is located in the CU 200, and the RLC layer, the MAC layer, and the physical (PHY) layer are located in the DU 300. In other words, the CU 200 executes processing of the PDCP layer, and the DU 300 executes processing of the RLC layer, the MAC layer, and the PHY layer. In this case, the interface 60 is an F1 interface.

Although an example in which the PDCP layer is located in the CU 200 has been described with reference to FIG. 4, the Service Data Adaptation Protocol (SDAP) layer may be located in the CU 200 particularly in a case of NGEN-DC or NE-DC.

In such a case of the Higher Layer Split, data transmitted between the SN (first base station 100) and the terminal apparatus 500 through the MN Terminated bearer may be transmitted between the MN (second base station 400) and the DU 300 of the SN via the CU 200 of the SN (first example). Alternatively, the data may be directly transmitted between the MN (second base station 400) and the DU 300 of the SN without passing through the CU 200 of the SN (second example).

Figure 5:
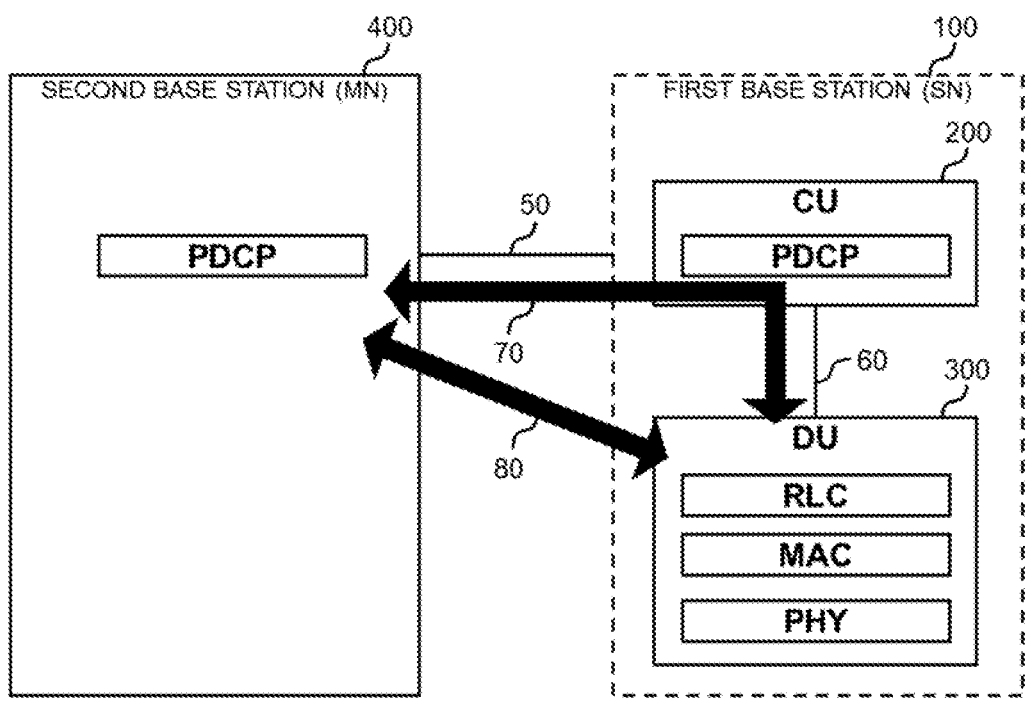
FIG. 5 is an explanatory diagram for describing an example of a data route regarding an MN Terminated bearer according to the example embodiment.

FIG. 5 is an explanatory diagram for describing an example of a data route regarding the MN Terminated bearer according to the present example embodiment. With reference to FIG. 5, the CU 200 and the DU 300 included in the first base station 100, and the second base station 400 are illustrated. In the first example, data transmitted between the SN (first base station 100) and the terminal apparatus 500 through the MN Terminated bearer may be transmitted between the MN (second base station 400) and the DU 300 of the SN via the CU 200. In other words, the data may be transmitted in a route 70 via the interface 50 (for example, X2-U) and the interface 60 (for example, F1-U). In the second example, the data may be directly transmitted between the MN (second base station 400) and the DU 300 of the SN without passing through the CU 200. In other words, the data may be transmitted in a route 80.

Note that, although an example of split of the first base station 100 has been described, the second base station 400 may also be split in a similar manner to the first base station 100. Alternatively, to the second base station 400, a split (for example, a Lower Layer Split) that is different from the split (Higher Layer Split) of the first base station 100 may be applied.

Lower Layer Split

Alternatively, the first base station 100 may be split by a Lower Layer Split.

Figure 6:
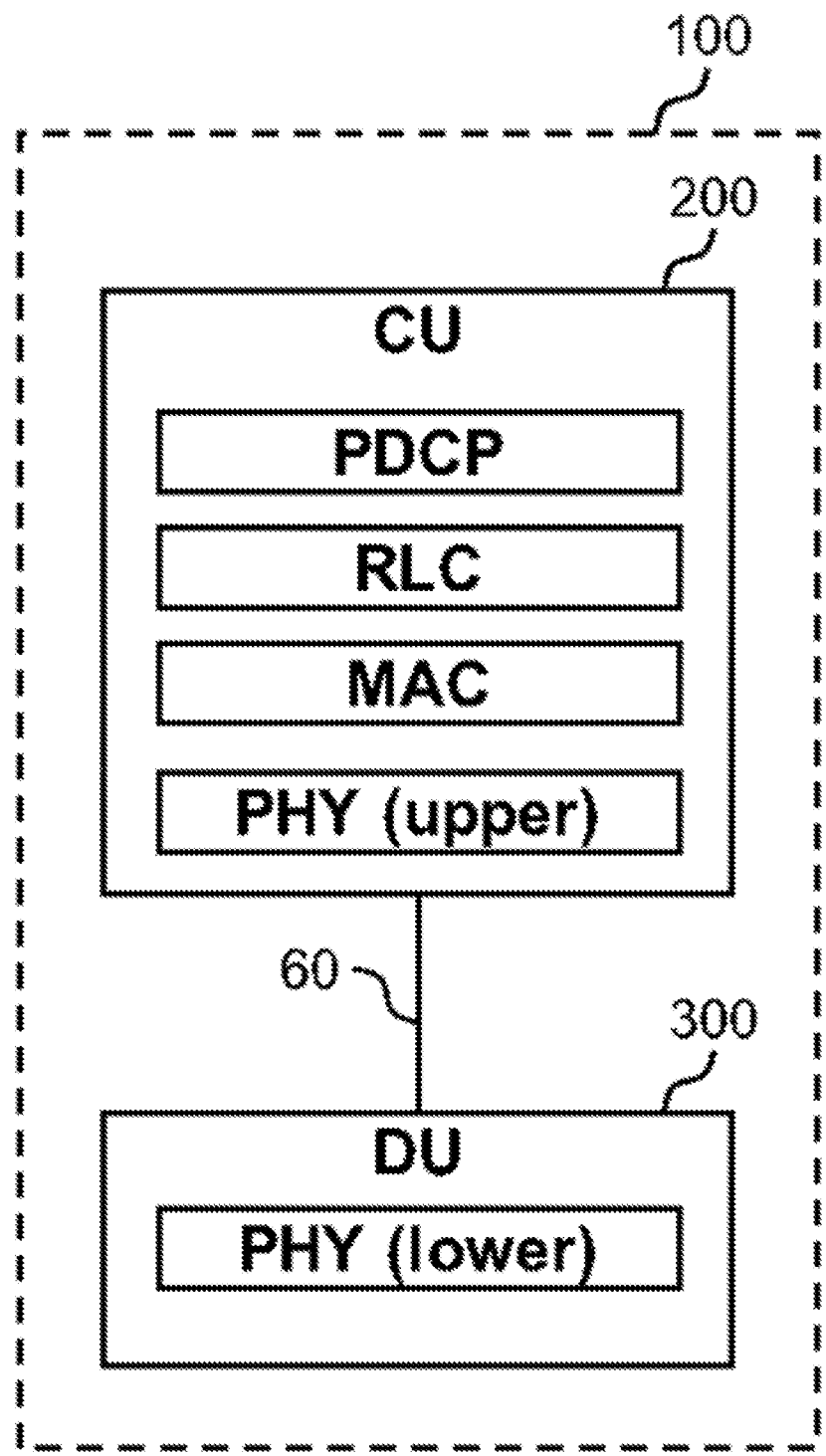
FIG. 6 is an explanatory diagram for describing a second example of split of the first base station according to the example embodiment.

FIG. 6 is an explanatory diagram for describing a second example of split of the first base station 100 according to the present example embodiment. With reference to FIG. 6, the CU 200 and the DU 300 included in the first base station 100 are illustrated. As illustrated in FIG. 6, the PDCP layer, the RLC layer, the MAC layer, and the physical (PHY) layer (upper part) may be located in the CU 200, and the PHY layer (lower part) may be located in the DU 300. In other words, the CU 200 may execute processing of the PDCP layer, the RLC layer, the MAC layer, and the PHY layer (upper part), and the DU 300 may execute processing of the PHY layer (lower part).

Note that, although an example of split of the first base station 100 has been described, the second base station 400 may also be split in a similar manner to the first base station 100. Alternatively, to the second base station 400, a split (for example, a Higher Layer Split) that is different from the split (Lower Layer Split) of the first base station 100 may be applied.

3. Configuration of Each Node

With reference to FIG. 7 to FIG. 10, a configuration of each node will be described.

<3.1. Configuration of Central Unit (CU)>

Figure 7:
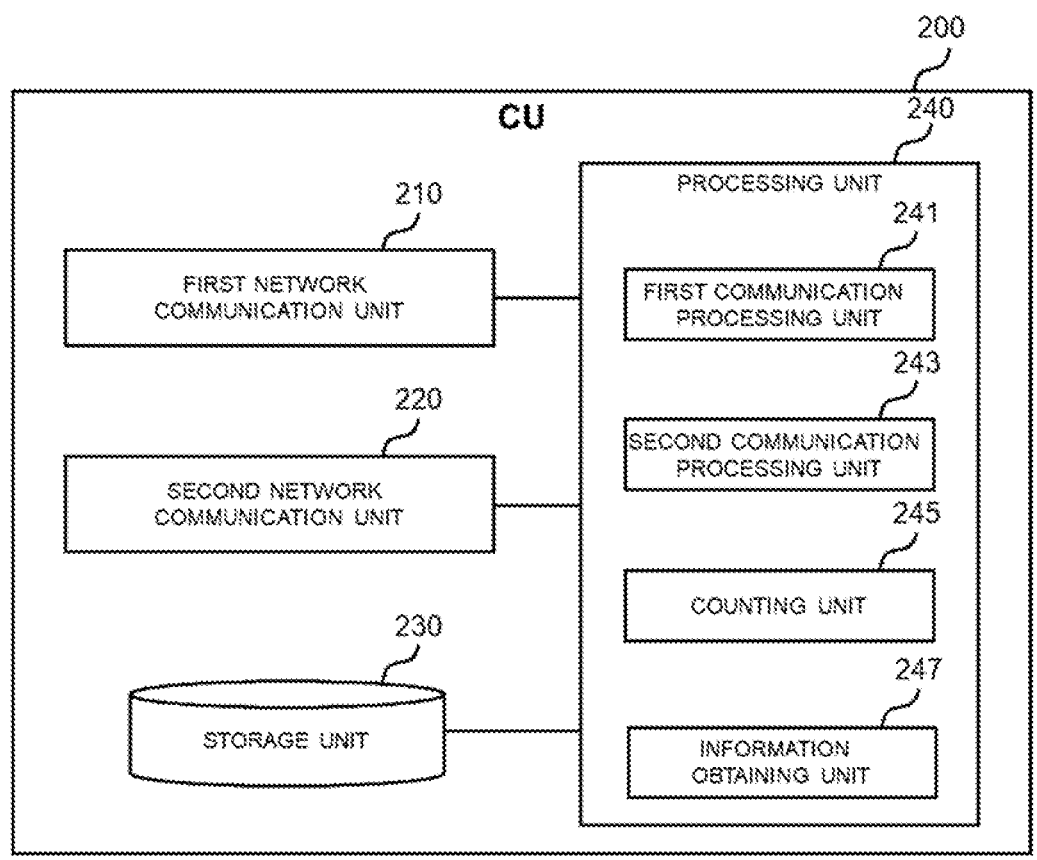
FIG. 7 is a block diagram illustrating an example of a schematic configuration of a CU according to the example embodiment.

FIG. 7 is a block diagram illustrating an example of a schematic configuration of the CU 200 according to the present example embodiment. With reference to FIG. 7, the CU 200 includes a first network communication unit 210, a second network communication unit 220, a storage unit 230, and a processing unit 240.

(1) First Network Communication Unit 210

The first network communication unit 210 receives a signal from the DU 300, and transmits a signal to the DU 300.

(2) Second Network Communication Unit 220

The second network communication unit 220 receives a signal from the second base station 400, and transmits a signal to the second base station 400.

The second network communication unit 220 may receive a signal from the core network 10, and may transmit a signal to the core network 10.

(3) Storage Unit 230

The storage unit 230 temporarily or permanently stores programs (instructions) and parameters for operations of the CU 200 as well as various data. The program includes one or more instructions for operations of the CU 200.

(4) Processing Unit 240

The processing unit 240 provides various functions of the CU 200. The processing unit 240 includes a first communication processing unit 241, a second communication processing unit 243, a counting unit 245, and an information obtaining unit 247. The counting unit 245 may be referred to as a measurement unit 245. Note that the processing unit 240 may further include constituent elements other than these constituent elements. In other words, the processing unit 240 may also perform operations other than the operations of these constituent elements.

For example, the processing unit 240 (first communication processing unit 241) communicates with the DU 300 via the first network communication unit 210. For example, the processing unit 240 (second communication processing unit 243) communicates with the second base station 400 (or the core network 10) via the second network communication unit 220.

(5) Implementation Example

Each of the first network communication unit 210 and the second network communication unit 220 may be implemented with a network adapter and/or a network interface card and the like. The storage unit 230 may be implemented with a memory (for example, a nonvolatile memory and/or a volatile memory) and/or a hard disk or the like. The processing unit 240 may be implemented with one or more processors, such as a baseband (BB) processor and/or a different kind of processor. The first communication processing unit 241, the second communication processing unit 243, the counting unit 245, and the information obtaining unit 247 may be implemented with the same processor, or may be implemented with separate processors. The memory (storage unit 230) may be included in the one or more processors, or may be provided outside the one or more processors.

The CU 200 may include a memory configured to store a program (instructions) and one or more processors that can execute the program (instructions). The one or more processors may execute the program and thereby perform operations of the processing unit 240 (operations of the first communication processing unit 241, the second communication processing unit 243, the counting unit 245, and/or the information obtaining unit 247). The program may be a program for causing the processor to execute operation of the processing unit 240 (operations of the first communication processing unit 241, the second communication processing unit 243, the counting unit 245, and/or the information obtaining unit 247).

Note that the CU 200 may be virtual. In other words, the CU 200 may be implemented as a virtual machine. In this case, the CU 200 (the virtual machine) may operate as a physical machine (hardware) including a processor, a memory, and the like, and a virtual machine on a hypervisor.

<3.2. Configuration of Distributed Unit (DU)>

Figure 8:
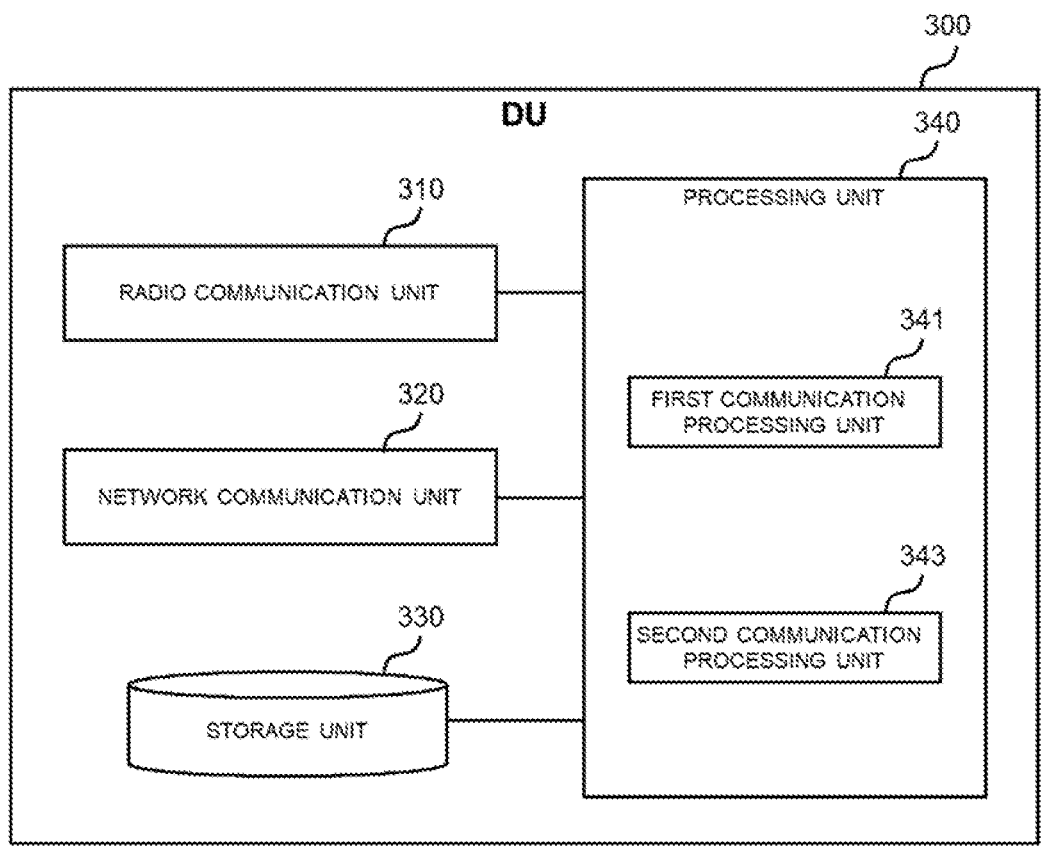
FIG. 8 is a block diagram illustrating an example of a schematic configuration of a DU according to the example embodiment.

FIG. 8 is a block diagram illustrating an example of a schematic configuration of the DU 300 according to the present example embodiment. With reference to FIG. 8, the DU 300 includes a radio communication unit 310, a network communication unit 320, a storage unit 330, and a processing unit 340.

(1) Radio Communication Unit 310

The radio communication unit 310 wirelessly transmits and/or receives a signal. For example, the radio communication unit 310 receives a signal from the terminal apparatus 500, and transmits a signal to the terminal apparatus 500.

(2) Network Communication Unit 320

The network communication unit 320 receives a signal from the CU 200, and transmits a signal to the CU 200. The network communication unit 320 may receive a signal from another node (for example, the second base station 400), and may transmit a signal to such another node.

(3) Storage Unit 330

The storage unit 330 temporarily or permanently stores programs (instructions) and parameters for operations of the DU 300 as well as various data. The program includes one or more instructions for operations of the DU 300.

(4) Processing Unit 340

The processing unit 340 provides various functions of the DU 300. The processing unit 340 includes a first communication processing unit 341 and a second communication processing unit 343. Note that the processing unit 340 may further include constituent elements other than these constituent elements. In other words, the processing unit 340 may also perform operations other than the operations of these constituent elements.

For example, the processing unit 340 (first communication processing unit 341) communicates with the terminal apparatus 500 via the radio communication unit 310. For example, the processing unit 340 (second communication processing unit 343) communicates with the CU 200 (or the second base station 400) via the network communication unit 320.

(5) Implementation Example

The radio communication section 310 may be implemented with an antenna, a radio frequency (RF) circuit, and the like, and the antenna may be a directional antenna. The network communication unit 320 may be implemented with a network adapter and/or a network interface card and the like. The storage unit 330 may be implemented with a memory (for example, a nonvolatile memory and/or a volatile memory) and/or a hard disk or the like. The processing unit 340 may be implemented with one or more processors, such as a baseband (BB) processor and/or a different kind of processor. The first communication processing unit 341 and the second communication processing unit 343 may be implemented with the same processor, or may be implemented with separate processors. The memory (storage unit 330) may be included in the one or more processors, or may be provided outside the one or more processors.

The DU 300 may include a memory configured to store a program (instructions) and one or more processors that can execute the program (instructions). The one or more processors may execute the program and thereby perform operations of the processing unit 340 (operations of the first communication processing unit 341 and/or the second communication processing unit 343). The program may be a program for causing the processor(s) to perform operations of the processing unit 340 (operations of the first communication processing unit 341 and the second communication processing unit 343).

Note that the DU 300 may be virtual. In other words, the DU 300 may be implemented as a virtual machine. In this case, the DU 300 (the virtual machine) may operate as a physical machine (hardware) including a processor, a memory, and the like, and a virtual machine on a hypervisor.

<3.3. Configuration of Second Base Station>

Figure 9:
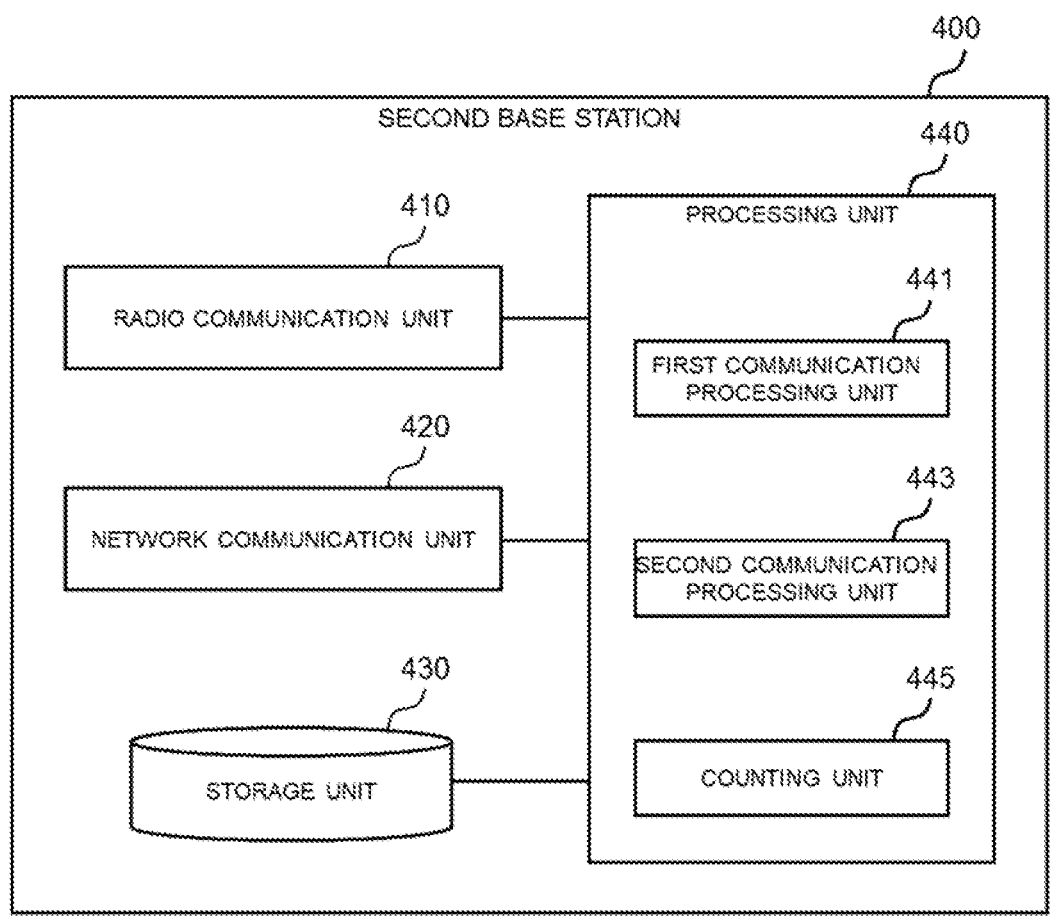
FIG. 9 is a block diagram illustrating an example of a schematic configuration of a second base station according to the example embodiment.

FIG. 9 is a block diagram illustrating an example of a schematic configuration of the second base station 400 according to the present example embodiment. With reference to FIG. 9, the second base station 400 includes a radio communication unit 410, a network communication unit 420, a storage unit 430, and a processing unit 440.

(1) Radio Communication Unit 410

The radio communication unit 410 wirelessly transmits and/or receives a signal. For example, the radio communication unit 410 receives a signal from the terminal apparatus 500, and transmits a signal to the terminal apparatus 500.

(2) Network Communication Unit 420

The network communication unit 420 receives a signal from the first base station 100 or the core network 10, and transmits a signal to the first base station 100 or the core network 10.

(3) Storage Unit 430

The storage unit 430 temporarily or permanently stores programs (instructions) and parameters for operations of the second base station 400 as well as various data. The program includes one or more instructions for operations of the second base station 400.

(4) Processing Unit 440

The processing unit 440 provides various functions of the second base station 400. The processing unit 440 includes a first communication processing unit 441, a second communication processing unit 443, and a counting unit 445. The counting unit 445 may be referred to as a measurement unit 445. Note that the processing unit 440 may further include constituent elements other than these constituent elements. In other words, the processing unit 440 may also perform operations other than the operations of these constituent elements.

For example, the processing unit 440 (first communication processing unit 441) communicates with the terminal apparatus 500 via the radio communication unit 410. For example, the processing unit 440 (second communication processing unit 443) communicates with the first base station 100 or the core network 10 via the network communication unit 420.

(5) Implementation Example

The radio communication unit 410 may be implemented with an antenna, a radio frequency (RF) circuit, and the like, and the antenna may be a directional antenna. The network communication unit 420 may be implemented with a network adapter and/or a network interface card and the like. The storage unit 430 may be implemented with a memory (e.g., a nonvolatile memory and/or a volatile memory) and/or a hard disk, and the like. The processing unit 440 may be implemented with one or more processors, such as a baseband (BB) processor and/or a different kind of processor. The first communication processing unit 441, the second communication processing unit 443, and the counting unit 445 may be implemented with the same processor, or may be implemented with separate processors. The memory (storage unit 430) may be included in the one or more processors, or may be provided outside the one or more processors.

The second base station 400 may include a memory configured to store a program (instructions) and one or more processors that can execute the program (instructions). The one or more processors may execute the program and thereby perform operations of the processing unit 440 (operations of the first communication processing unit 441, the second communication processing unit 443, and/or the counting unit 445). The program may be a program for causing the processor to execute operation of the processing unit 440 (the first communication processing unit 441, the second communication processing unit 443, and/or the counting unit 445).

The second base station 400 may include a central unit (CU) and a distributed unit(s) (DU). The CU may include the network communication unit 420 and the second communication processing unit 443 (and the counting unit 445), and the DU may include the radio communication unit 410 and the first communication processing unit 441.

Note that the second base station 400 (or the CU or the DU constituting a part of the second base station 400) may be virtual. In other words, the second base station 400 (or the CU or the DU constituting a part of the second base station 400) may be implemented as a virtual machine. In this case, the second base station 400 (or the CU or the DU constituting a part of the second base station 400) (the virtual machine) may operate as a physical machine (hardware) including a processor, a memory, and the like, and a virtual machine on a hypervisor.

<3.4. Configuration of Terminal Apparatus>

Figure 10:
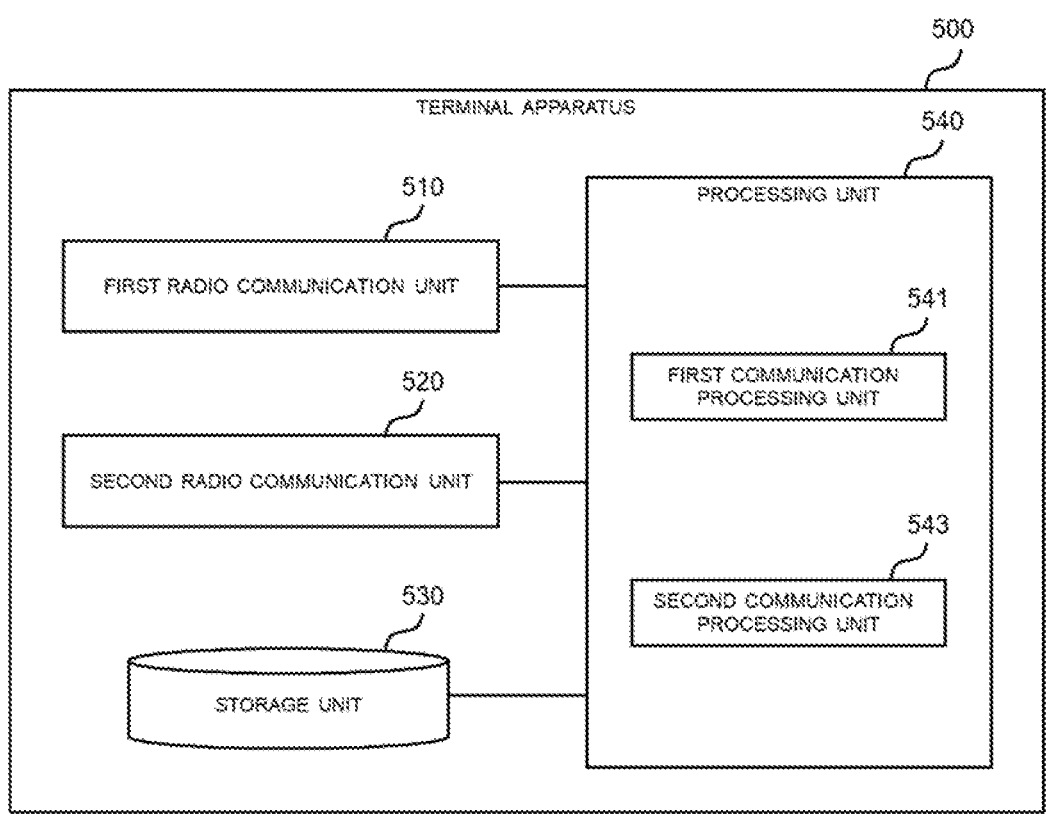
FIG. 10 is a block diagram illustrating an example of a schematic configuration of a terminal apparatus according to the example embodiment.

FIG. 10 is a block diagram illustrating an example of a schematic configuration of the terminal apparatus 500 according to the present example embodiment. With reference to FIG. 10, the terminal apparatus 500 includes a first radio communication unit 510, a second radio communication unit 520, a storage unit 530, and a processing unit 540.

(1) First Radio Communication Unit 510

The first radio communication unit 510 wirelessly transmits and/or receives a signal. For example, the first radio communication unit 510 receives a signal from the first base station 100, and transmits a signal to the first base station 100.

(2) Second Radio Communication Unit 520

The second radio communication unit 520 wirelessly transmits and/or receives a signal. For example, the second radio communication unit 520 receives a signal from the second base station 400, and transmits a signal to the second base station 400.

(3) Storage Unit 530

The storage unit 530 temporarily or permanently stores programs (instructions) and parameters for operations of the terminal apparatus 500 as well as various data. The program includes one or more instructions for operations of the terminal apparatus 500.

(4) Processing Unit 540

The processing unit 540 provides various functions of the terminal apparatus 500. The processing unit 540 includes a first communication processing unit 541 and a second communication processing unit 543. Note that the processing unit 540 may further include constituent elements other than these constituent elements. In other words, the processing unit 540 may also perform operations other than the operations of these constituent elements.

For example, the processing unit 540 (first communication processing unit 541) communicates with the first base station 100 via the first radio communication unit 510. For example, the processing unit 540 (second communication processing unit 543) communicates with the second base station 400 via the second radio communication unit 520.

(5) Implementation Example

Each of the first radio communication unit 510 and the second radio communication unit 520 may be implemented with an antenna, a radio frequency (RF) circuit, and the like. The storage unit 530 may be implemented with a memory (e.g., a nonvolatile memory and/or a volatile memory) and/or a hard disk, and the like. The processing unit 540 may be implemented with one or more processors, such as a baseband (BB) processor and/or a different kind of processor. The first communication processing unit 541 and the second communication processing unit 543 may be implemented with the same processor, or may be implemented with separate processors. The memory (storage unit 530) may be included in the one or more processors, or may be provided outside the one or more processors. As an example, the processing section 540 may be implemented in a system on chip (SoC).

The terminal apparatus 500 may include a memory configured to store a program (instructions) and one or more processors that can execute the program (instructions). The one or more processors may be a program for causing the processor to execute operation of the processing unit 540 (operations of the first communication processing unit 541 and/or the second communication processing unit 543) by executing the program.

4. First Example Embodiment

Figure 13:
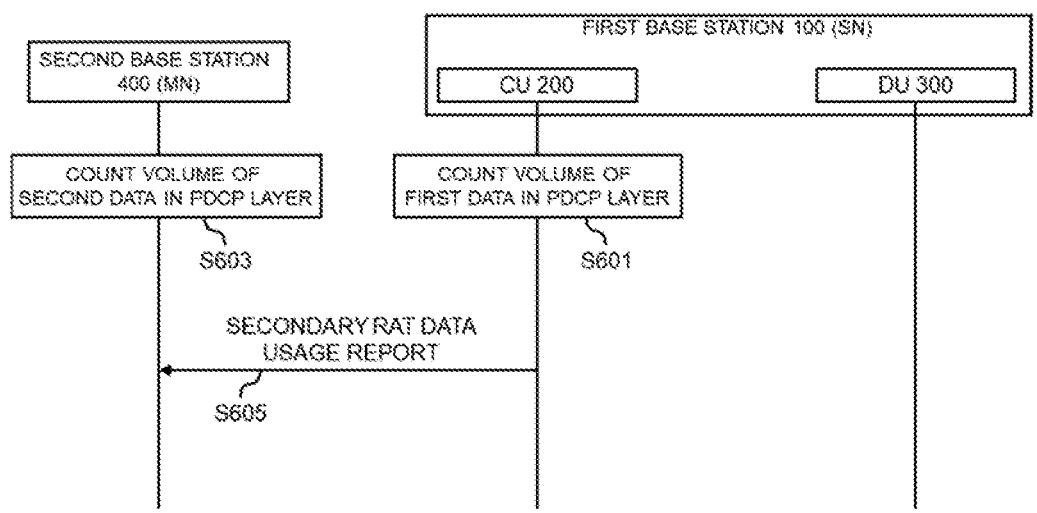
FIG. 13 is a sequence diagram for describing an example of a general flow of processing according to the first example embodiment.

With reference to FIG. 11 to FIG. 13, a first example embodiment of the present invention will be described.

(1) Transmission of Data Volume Information

The first base station 100 operates as a secondary node (SN) of dual connectivity using at least NR for the terminal apparatus 500, and the second base station 400 operates as a master node (MN) of the dual connectivity for the terminal apparatus 500. In this case, the first base station 100 (SN) obtains data volume information indicating the volume of data transmitted between the first base station 100 and the terminal apparatus 500, and transmits the data volume information to the second base station 400 (MN).

More specifically, the CU 200 (information obtaining unit 247) included in the first base station 100 (SN) obtains the data volume information, and the CU 200 (second communication processing unit 243) transmits the data volume information to the second base station 400 (MN).

For example, the CU 200 (second communication processing unit 243) transmits a message including the data volume information to the second base station 400. Specifically, for example, the dual connectivity is EN-DC, the interface 50 between the first base station 100 and the second base station 400 is an X2 interface, and the message is an X2 message. For example, the message is a Secondary RAT Data Usage Report message. Further, for example, the data volume information is a Usage count UL and a Usage count DL. The Usage count UL and the Usage count DL may be referred to as a Data Usage UL and a Data Usage DL, respectively. The data volume information may be data usage volume.

FIG. 11 and FIG. 12 are each an explanatory diagram for describing an example of a SECONDARY RAT DATA USAGE REPORT message according to the first example embodiment. FIG. 11 illustrates details of the SECONDARY RAT DATA USAGE REPORT message, and the SECONDARY RAT DATA USAGE REPORT message includes a Secondary RAT Usage Report list. FIG. 12 illustrates details of the Secondary RAT Usage Report list, and the Secondary RAT Usage Report list includes a Usage count UL IE and a Usage count DL IE (i.e., counted data volume).

As illustrated in FIG. 12 as well, for example, the data volume information includes information of each bearer (information indicating the volume of data of each bearer). The bearer herein may be a radio bearer (RB), or may be a radio access bearer (RAB). Alternatively, the data volume information may include information of each QoS flow (information indicating the volume of data of each QoS flow).

(2) Counting of Data Volume

The first base station 100 counts the volume of the data transmitted between the first base station 100 (SN) and the terminal apparatus 500. Note that the expression "to count" may be replaced with the expression "to measure".

PDCP

In particular, the first base station 100 counts the volume of the data in the PDCP layer or between the PDCP layer and the RLC layer.

As has been described with reference to FIG. 4 and FIG. 5, processing of the PDCP layer is performed by the CU 200 irrespective of the type of split of the first base station 100. Thus, the CU 200 (counting unit 245) of the first base station 100 counts the volume of the data.

For example, the first base station 100 (CU 200: counting unit 245) counts the data volume of packets of the PDCP. For example, such a packet may be a protocol data unit (PDU) of the PDCP. Alternatively, the packet may be another data unit (for example, a service data unit (SDU) of the PDCP).

The configuration described above enables, for example, reporting of the data volume from the secondary node (SN) to the master node (MN) in dual connectivity. Specifically, for example, the first base station 100 operating as an SN is split into the CU 200 and the DU(s) 300, and processing of the PDCP layer is executed in the CU 200 irrespective of a type of the split (Higher Layer Split or Lower Layer Split). Thus, counting of the data volume in the PDCP layer or between the PDCP layer and the RLC layer may be performed by the CU 200 that handles reporting the data volume to the MN. Consequently, the CU 200 can report the counted data volume to the MN.

Data to be Counted

First Data

In the first example embodiment, the data (to be a target of counting of data volume) is first data transmitted between the first base station 100 and the terminal apparatus 500 through at least one radio bearer terminated at the secondary node (SN) (first base station 100). In other words, the first base station 100 (CU 200: counting unit 245) counts the volume of the first data.

For example, the at least one radio bearer terminated at the SN (first base station 100) includes an SN Terminated bearer, and the first data is data transmitted between the first base station 100 (SN) and the terminal apparatus 500 through a Split bearer and an SCG bearer being respectively in the SN Terminated bearer.

Second Data

Note that, in the first example embodiment, the data (to be a target of counting of data volume) does not include second data transmitted between the first base station 100 and the terminal apparatus 500 through a radio bearer terminated at the master node (MN) (second base station 400). In other words, the first base station 100 (CU 200: counting unit 245) does not count the volume of the second data.

In the first example embodiment, instead of the first base station 100, the second base station 400 (counting unit 445) counts the volume of the second data.

For example, the radio bearer terminated at the MN (second base station 400) includes an MN Terminated bearer, and the second data is data transmitted between the first base station 100 (SN) and the terminal apparatus 500 through a Split bearer and an SCG bearer being respectively in the MN Terminated bearer.

As described above, the volume of the first data transmitted through the radio bearer (SN Terminated bearer) terminated at the SN is counted by the first base station 100 being the SN, and the volume of the second data transmitted through the radio bearer (MN Terminated bearer) terminated at the MN is counted by the second base station 400 being the MN.

The configuration described above enables, for example, further reduction of reporting (of the data volume) from the SN (first base station 100) to the MN (second base station 400). For example, the configuration may further facilitate counting of the data volume.

Bearer/QoS Flow

For example, counting of data volume is performed for each bearer. The bearer herein may be a radio bearer (RB), or may be a radio access bearer (RAB). Alternatively, counting of the data volume may be performed for each QoS flow.

Counting Based on Delivery Status of Downlink Data

For example, the data (the first data) (to be a target of counting of data volume) includes downlink data transmitted from the first base station 100 to the terminal apparatus 500 and uplink data transmitted from the terminal apparatus 500 to the first base station 100.

For example, the first base station 100 (CU 200: counting unit 245) counts the volume of the downlink data, based on a status of delivery of the downlink data to the terminal apparatus 500. For example, the status of the delivery is a delivery status confirmed in a layer (for example, the RLC layer) that is lower than the PDCP layer.

For example, the CU 200 executes processing of the PDCP layer, and the DU 300 executes processing of the RLC layer (and its lower layers) (Higher Layer Split). In this case, the status of the delivery is information transmitted from the DU 300 to the CU 200 (via an F1 interface). In one example, the status of the delivery is indicated in a DL DATA DELIVERY STATUS frame.

Alternatively, the CU 200 may execute processing of the PDCP layer, the RLC layer, the MAC layer, and the PHY layer (upper part), and the DU 300 may execute processing of the PHY layer (lower part) (Lower Layer Split). In this case, the status of the delivery may be information generated by the CU 200 itself.

The configuration described above enables, for example, counting of the data volume based on whether or not the terminal apparatus 500 has actually received downlink data, regardless of whether the data volume is to be counted in the PDCP layer or the data volume is to be counted between the PDCP layer and the RLC layer.

Note that the second data transmitted between the first base station 100 and the terminal apparatus 500 through a radio bearer terminated at the MN (second base station 400) may also include downlink data transmitted from the first base station 100 to the terminal apparatus 500 and uplink data transmitted from the terminal apparatus 500 to the first base station 100. In this case, the second base station 400 (counting unit 445) may count the volume of the downlink data, based on a status of delivery of the downlink data to the terminal apparatus 500. The status of the delivery may be a delivery status confirmed in a layer (for example, the RLC layer) that is lower than the PDCP layer. The status of the delivery may be information transmitted from the first base station 100 to the second base station 400, and may be indicated in a DL DATA DELIVERY STATUS frame.

(3) Transmission of Data Volume Information by Second Base Station

The second base station 400 (first communication processing unit 441) receives the message including the data volume information from the first base station 100 (CU 200).

For example, the second base station 400 (second communication processing unit 443) further transmits, to the core network 10, a message with the data volume information (other data volume information indicating the volume of the second data).

For example, the message transmitted to the core network 10 includes the data volume information (and such other data volume information), and includes information indicating the volume of data of each bearer (or QoS flow). Alternatively, the message transmitted to the core network 10 may further include other data volume information (for example, aggregated data volume information) that is generated based on the data volume information (and such other data volume information) (by the second base station 400).

For example, the dual connectivity is EN-DC, the interface 40 between the second base station 400 and the core network 10 is an S1 interface, and the message is an S1 message. More specifically, for example, the message is a SECONDARY RAT REPORT message, and includes a Usage count UL IE and a Usage count DL IE (i.e., counted data volume). The Usage count UL and the Usage count DL may be referred to as a Data Usage UL and a Data Usage DL, respectively. The data volume information may be data usage volume.

(4) Flow of Processing

FIG. 13 is a sequence diagram for describing an example of a general flow of processing according to the first example embodiment.

The first base station 100 (CU 200) being an SN counts the volume of first data transmitted between the first base station 100 (SN) and the terminal apparatus 500 through the SN Terminated bearer in the PDCP layer (S601).

The second base station 400 being an MN counts the volume of second data transmitted between the first base station 100 (SN) and the terminal apparatus 500 through the MN Terminated bearer in the PDCP layer (S603).

The first base station 100 (CU 200) transmits, to the second base station 400, a SECONDARY RAT DATA USAGE REPORT message including data volume information (Usage count UL IE and Usage count DL IE) indicating the counted volume of the first data (S605).

Note that the second base station 400 may further transmit, to the core network 10, a SECONDARY RAT REPORT message (SECONDARY RAT REPORT message including Usage count UL IE and Usage count DL IE) with the data volume information (other data volume information indicating the volume of the second data).

5. Second Example Embodiment

Figure 14:
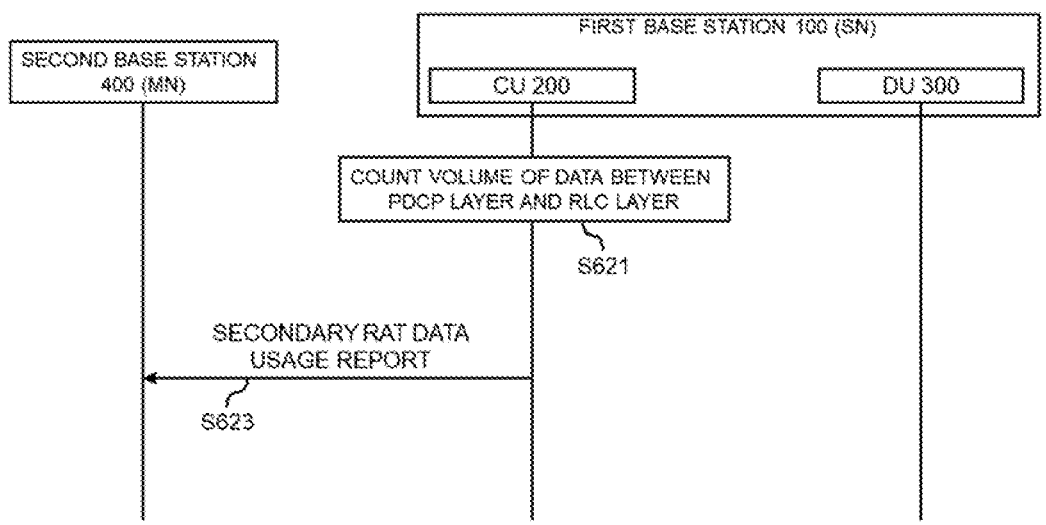
FIG. 14 is a sequence diagram for describing an example of a general flow of processing according to a second example embodiment.

With reference to FIG. 14, the first example embodiment of the present invention will be described.

(1) Transmission of Data Volume Information

The first base station 100 operates as a secondary node (SN) of dual connectivity using at least NR for the terminal apparatus 500, and the second base station 400 operates as a master node (MN) of the dual connectivity for the terminal apparatus 500. In this case, the first base station 100 (SN) obtains data volume information indicating the volume of data transmitted between the first base station 100 and the terminal apparatus 500, and transmits the data volume information to the second base station 400 (MN).

In this respect, there is no difference in description between the first example embodiment and the second example embodiment. Thus, redundant description will be herein omitted.

(2) Counting of Data Volume

The first base station 100 counts the volume of the data transmitted between the first base station 100 (SN) and the terminal apparatus 500. Note that the expression "to count" may be replaced with the expression "to measure".

PDCP

In particular, the first base station 100 counts the volume of the data in the PDCP layer or between the PDCP layer and the RLC layer.

In this respect, there is no difference in description between the first example embodiment and the second example embodiment. Thus, redundant description will be herein omitted.

Data to be Counted

In the second example embodiment, the data (to be a target of counting of data volume) includes first data transmitted between the first base station 100 and the terminal apparatus 500 through a radio bearer terminated at the secondary node (SN) (first base station 100) and second data transmitted between the first base station 100 and the terminal apparatus 500 through a radio bearer terminated at the master node (MN) (second base station 400). Thus, the data volume information includes first data volume information indicating the volume of the first data and second data volume information indicating the volume of the second data.

For example, the radio bearer terminated at the SN (first base station 100) is an SN Terminated bearer, and the first data is data transmitted between the first base station 100 (SN) and the terminal apparatus 500 through a Split bearer and an SCG bearer being respectively in the SN Terminated bearer.

For example, the radio bearer terminated at the MN (second base station 400) is an MN Terminated bearer, and the second data is data transmitted between the first base station 100 (SN) and the terminal apparatus 500 through a Split bearer and an SCG bearer being respectively in the MN Terminated bearer.

As described above, in the second example embodiment, the first base station 100 (CU 200) also counts the volume of the second data transmitted through a radio bearer terminated at the MN (second base station 400). Regarding the second data, processing of the PDCP layer is performed in the second base station 400 (MN), and processing of the RLC layer and its lower layers is performed in the first base station 100 (SN). Thus, the first base station 100 (CU 200) counts at least the volume of the second data between the PDCP layer and the RLC layer. In one example, the first base station 100 (CU 200) includes an entity for counting the data volume between the PDCP layer and the RLC layer, and the entity (counting unit 245) counts at least the volume of the second data. Note that, for example, the first base station 100 (CU 200) also counts the volume of the first data between the PDCP layer and the RLC layer. Alternatively, the first base station 100 (CU 200) may count the volume of the first data in the PDCP layer.

In the second example embodiment, for example, the CU 200 executes processing of the PDCP layer, and the DU 300 executes processing of the RLC layer (and its lower layers) (Higher Layer Split). As has been described with reference to FIG. 5, in a case of the Higher Layer Split, the second data is transmitted in a route (route 70) passing through the CU 200 or in a direct route (route 80) without passing through the CU 200. In particular, in the second example embodiment, the second data is transmitted between the second base station 400 (MN) and the DU 300 via the CU 200. In other words, the second route is transmitted in the route 70 illustrated in FIG. 5. Then, the volume of the second data is counted by the CU 200. The configuration described above enables, for example, counting of the data volume with the CU 200 even in a case of the Higher Layer Split.

As described above, both of the volume of the first data transmitted through the radio bearer (SN Terminated bearer) terminated at the SN and the volume of the second data transmitted through the radio bearer (MN Terminated bearer) terminated at the MN are counted by the first base station 100 being the SN.

The configuration described above enables, for example, obtaining of data volume information indicating the volume of data transmitted between the SN (first base station 100) and the terminal apparatus 500 without the MN (second base station 400) itself counting the data volume.

Bearer/QoS Flow

For example, counting of data volume is performed for each bearer. The bearer herein may be a radio bearer (RB), or may be a radio access bearer (RAB). Alternatively, counting of the data volume may be performed for each QoS flow.

Counting Based on Delivery Status of Downlink Data

For example, the data (the first data and the second data) (to be a target of counting of data volume) includes downlink data transmitted from the first base station 100 to the terminal apparatus 500 and uplink data transmitted from the terminal apparatus 500 to the first base station 100.

For example, the first base station 100 (CU 200: counting unit 245) counts the volume of the downlink data, based on a status of delivery of the downlink data to the terminal apparatus 500. For example, the status of the delivery is a delivery status confirmed in a layer (for example, the RLC layer) that is lower than the PDCP layer.

For example, the CU 200 executes processing of the PDCP layer, and the DU 300 executes processing of the RLC layer (and its lower layers) (Higher Layer Split). In this case, the status of the delivery is information transmitted from the DU 300 to the CU 200 (via an F1 interface). In one example, the status of the delivery is indicated in a DL DATA DELIVERY STATUS frame.

Alternatively, the CU 200 may execute processing of the PDCP layer, the RLC layer, the MAC layer, and the PHY layer (upper part), and the DU 300 may execute processing of the PHY layer (lower part) (Lower Layer Split). In this case, the status of the delivery may be information generated by the CU 200 itself.

The configuration described above enables, for example, counting of the data volume based on whether or not the terminal apparatus 500 has actually received downlink data, regardless of whether the data volume is to be counted in the PDCP layer or the data volume is to be counted between the PDCP layer and the RLC layer.

(3) Transmission of Data Volume Information by Second Base Station

The second base station 400 (first communication processing unit 441) receives the message including the data volume information from the first base station 100 (CU 200).

For example, the second base station 400 (second communication processing unit 443) further transmits, to the core network 10, a message with the data volume information.

For example, the message transmitted to the core network 10 includes the data volume information, and includes information indicating the volume of data of each bearer (or QoS flow). Alternatively, the message transmitted to the core network 10 may include other data volume information (for example, aggregated data volume information) that is generated based on the data volume information (by the second base station 400).

For example, the dual connectivity is EN-DC, the interface 40 between the second base station 400 and the core network 10 is an S1 interface, and the message is an S1 message. More specifically, for example, the message is a SECONDARY RAT REPORT message, and includes a Usage count UL IE and a Usage count DL IE (i.e., counted data volume).

(4) Flow of Processing

FIG. 14 is a sequence diagram for describing an example of a general flow of processing according to the second example embodiment.

The first base station 100 (CU 200) being an SN counts the volume of data transmitted between the first base station 100 (SN) and the terminal apparatus 500 between the PDCP layer and the RLC layer (S621). The data includes first data transmitted between the first base station 100 (SN) and the terminal apparatus 500 through the SN Terminated bearer and second data transmitted between the first base station 100 (SN) and the terminal apparatus 500 through the MN Terminated bearer.

The first base station 100 (CU 200) transmits, to the second base station 400, a SECONDARY RAT DATA USAGE REPORT message including data volume information (Usage count UL IE and Usage count DL IE) indicating the counted volume of the data (S623).

Note that the second base station 400 may further transmit, to the core network 10, a SECONDARY RAT REPORT message (SECONDARY RAT REPORT message including Usage count UL IE and Usage count DL IE) with the data volume information.

6. Example Alterations

With reference to FIG. 15 to FIG. 18, example alterations of the present example embodiment will be described.

(1) Central Unit

In particular, in an example alteration of the present example embodiment, the central unit (CU) 200 includes a first central unit for a control plane and a second central unit for a user plane.

Figure 15:
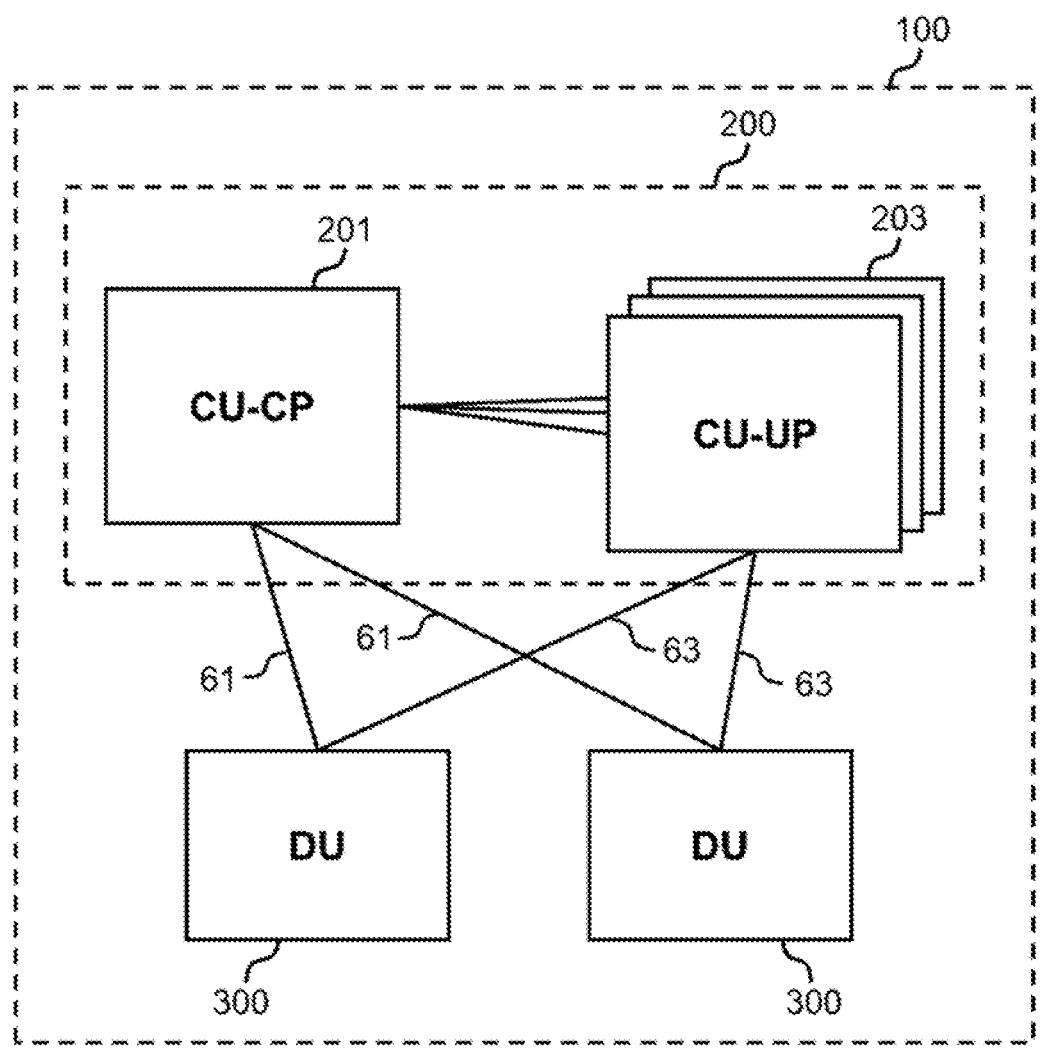
FIG. 15 is an explanatory diagram for describing an example of split of the first base station according to an example alteration of the example embodiment.

FIG. 15 is an explanatory diagram for describing an example of split of the first base station 100 according to an example alteration of the present example embodiment. With reference to FIG. 15, the first base station 100 includes a central unit (CU) 200 and distributed units (DUs) 300. Further, in the example alteration of the present example embodiment, the CU 200 includes a CU-CP 201 being the first central unit for the control plane and a CU-UP being the second central unit for the user plane. There may be a plurality of CU-UPs 203 for one CU-CP 201. Each of the DUs 300 communicates with the CU-CP 201 via an interface 61, and communicates with the CU-UP 203 via an interface 63.

For example, the CU 200 executes processing of the PDCP layer, and each DU 300 executes processing of the RLC layer and the MAC layer. In other words, the first base station 100 is split by the Higher Layer Split.

Figure 16:
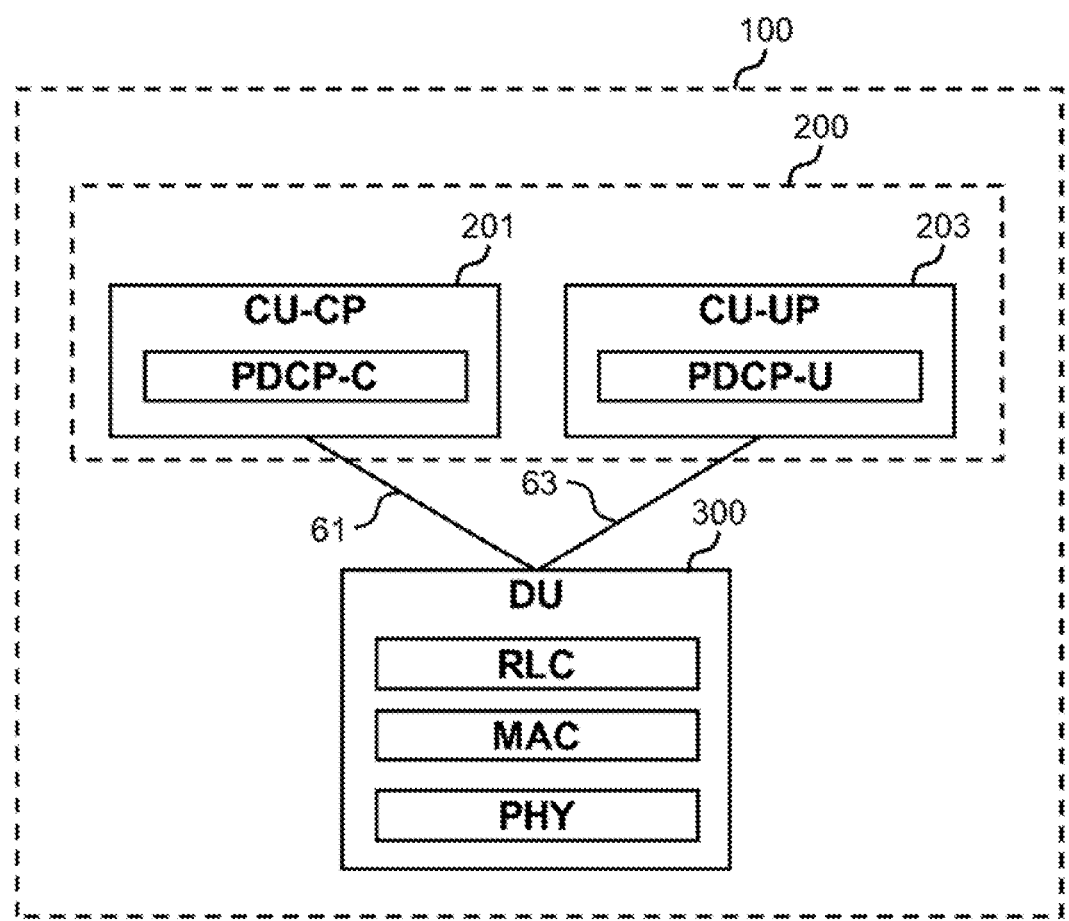
FIG. 16 is an explanatory diagram for describing an example of split (Higher Layer Split) of the first base station 100 according to an example alteration of the example embodiment.

FIG. 16 is an explanatory diagram for describing an example of split (Higher Layer Split) of the first base station 100 according to an example alteration of the present example embodiment. With reference to FIG. 16, the CU 200 and the DU 300 included in the first base station 100 are illustrated. The PDCP layer is located in the CU 200, and the RLC layer, the MAC layer, and the physical (PHY) layer are located in the DU 300. In other words, the CU 200 executes processing of the PDCP layer, and the DU 300 executes processing of the RLC layer, the MAC layer, and the PHY layer. Further, the control plane of the PDCP layer is located in the CU-CP 201, and the user plane of the PDCP layer is located in the CU-UP 203. In this case, the interface 61 is an F1-C interface, and the interface 63 is an F1-U interface.

Alternatively, in the example alteration of the present example embodiment, the CU 200 may execute processing of the PDCP layer and processing of the RLC layer and the MAC layer. In other words, the first base station 100 may be split by the Lower Layer Split.

Referring back to FIG. 7, for example, the counting unit 245 of the CU 200 is included in the CU-UP 203, and the information obtaining unit 247 and the second communication processing unit 243 of the CU 200 are included in the CU-CP 201.

The CU-UP 203 (counting unit 245) counts the volume of data transmitted between the first base station 100 (SN of dual connectivity using at least NR) and the terminal apparatus 500. Then, the CU-UP 203 (communication processing unit) transmits data volume information indicating the volume of the data to the CU-CP 201.

The CU-CP 201 (information obtaining unit 247) obtains the data volume information. Then, the CU-CP 201 (second communication processing unit 243) transmits the data volume information to the second base station 400 (MN of the dual connectivity).

(2) Example Alteration of First Example Embodiment

Figure 17:
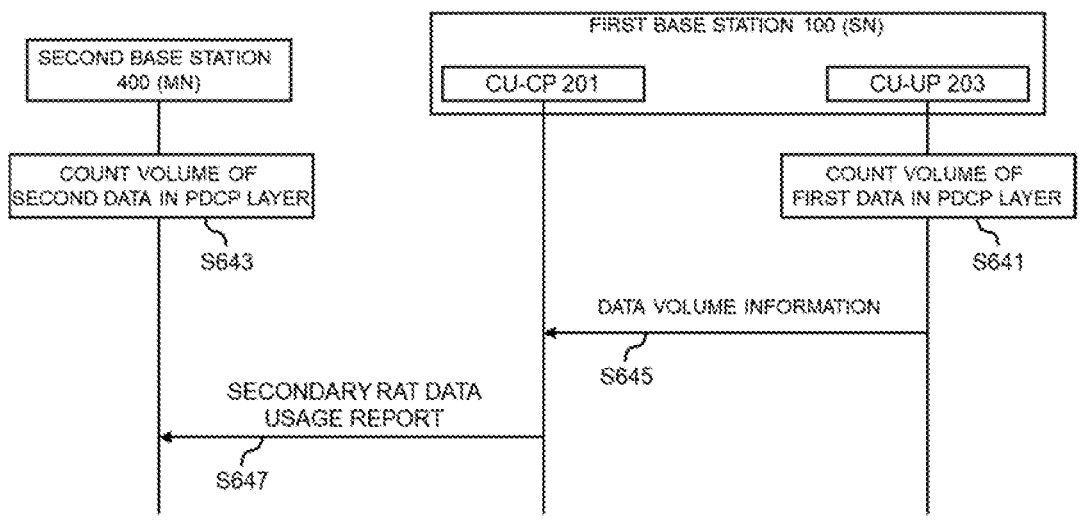
FIG. 17 is a sequence diagram for describing an example of a general flow of processing according to an example alteration of the first example embodiment.

FIG. 17 is a sequence diagram for describing an example of a general flow of processing according to an example alteration of the first example embodiment.

The CU-UP 203 of the first base station 100 being an SN counts the volume of first data transmitted between the first base station 100 (SN) and the terminal apparatus 500 through the SN Terminated bearer in the PDCP layer (S641).

The second base station 400 being an MN counts the volume of second data transmitted between the first base station 100 (SN) and the terminal apparatus 500 through the MN Terminated bearer in the PDCP layer (S643).

The CU-UP 203 transmits data volume information indicating the counted volume of the first data to the CU-CP 201 of the first base station 100 (S645).

The CU-CP 201 transmits, to the second base station 400, a SECONDARY RAT DATA USAGE REPORT message including the data volume information (Usage count UL IE and Usage count DL IE) (S647).

Note that the second base station 400 may further transmit, to the core network 10, a SECONDARY RAT REPORT message (SECONDARY RAT REPORT message including Usage count UL IE and Usage count DL IE) with the data volume information (other data volume information indicating the volume of the second data).

(3) Example Alteration of Second Example Embodiment

Figure 18:
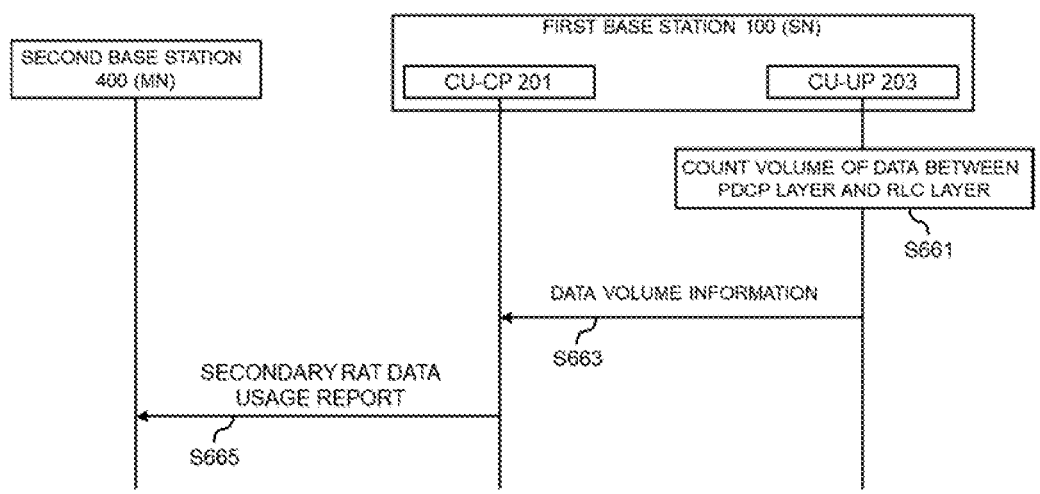
FIG. 18 is a sequence diagram for describing an example of a general flow of processing according to an example alteration of the second example embodiment.

FIG. 18 is a sequence diagram for describing an example of a general flow of processing according to an example alteration of the second example embodiment.

The CU-UP 203 of the first base station 100 being an SN counts, between the PDCP layer and the RLC layer, the volume of data transmitted between the first base station 100 (SN) and the terminal apparatus 500 (S661). The data includes first data transmitted between the first base station 100 (SN) and the terminal apparatus 500 through the SN Terminated bearer and second data transmitted between the first base station 100 (SN) and the terminal apparatus 500 through the MN Terminated bearer.

The CU-UP 203 transmits data volume information indicating the counted volume of the data to the CU-CP 201 of the first base station 100 (S663).

The CU-CP 201 transmits, to the second base station 400, a SECONDARY RAT DATA USAGE REPORT message including the data volume information (Usage count UL IE and Usage count DL IE) (S665).

Note that the second base station 400 may further transmit, to the core network 10, a SECONDARY RAT REPORT message (SECONDARY RAT REPORT message including Usage count UL IE and Usage count DL IE) with the data volume information.

7. Third Example Embodiment

Figure 19:
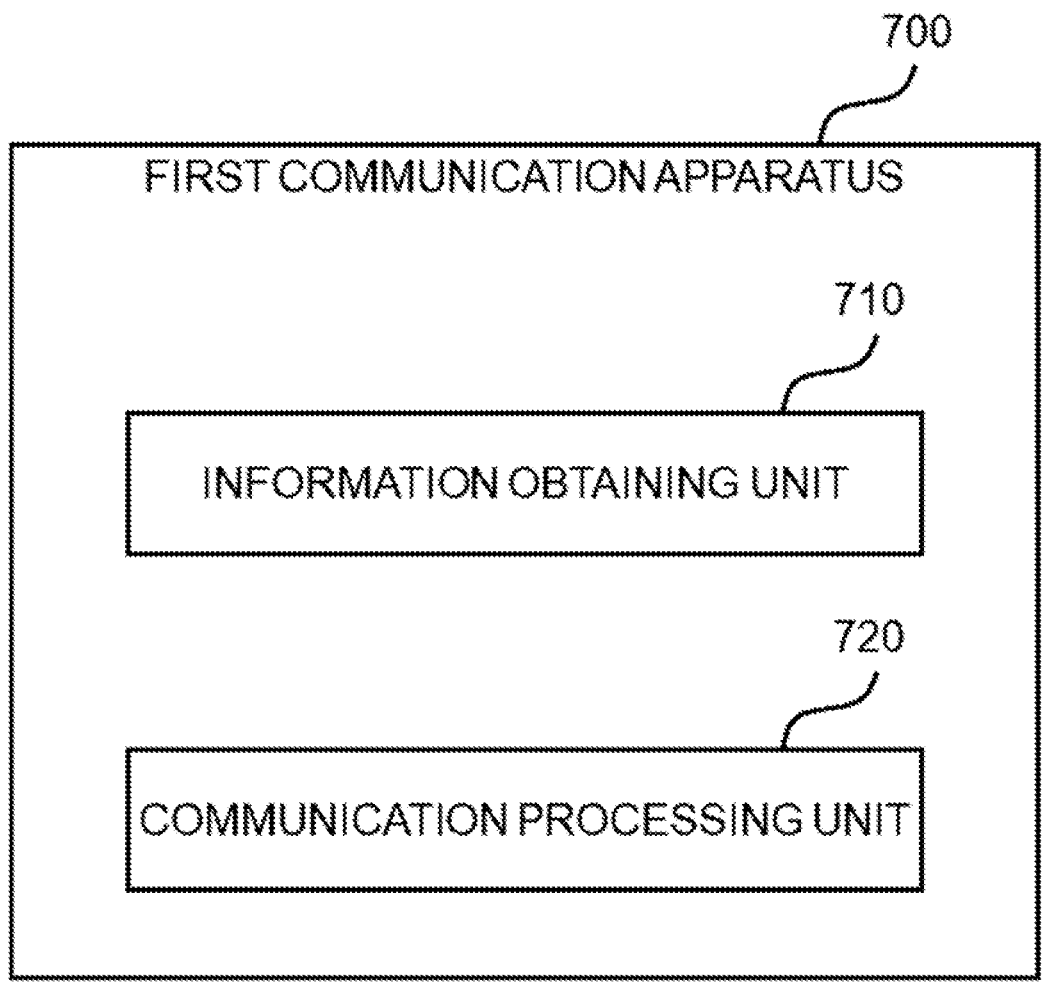
FIG. 19 is a block diagram illustrating an example of a schematic configuration of a first communication apparatus according to a third example embodiment.
Figure 20:
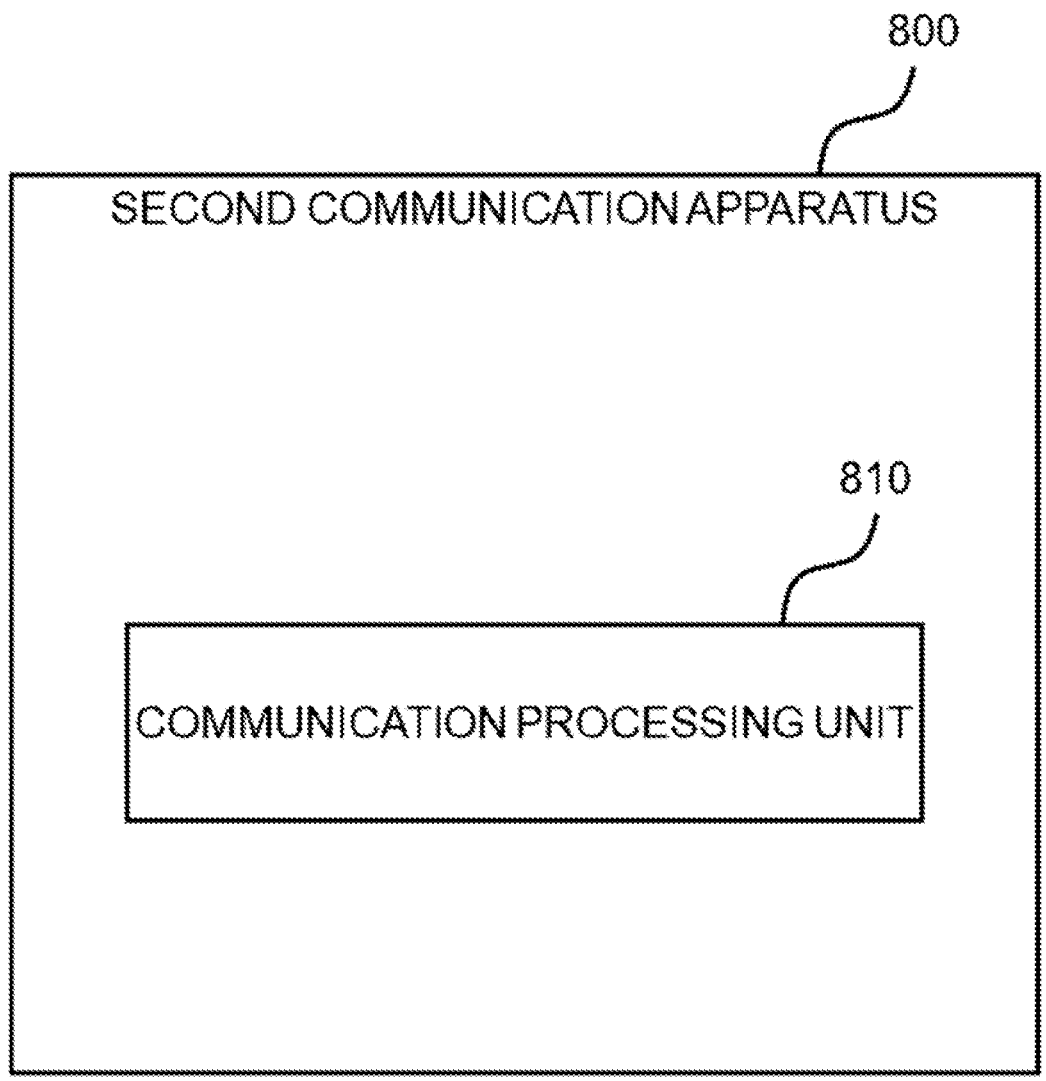
FIG. 20 is a block diagram illustrating an example of a schematic configuration of a second communication apparatus according to the third example embodiment.
Figure 21:
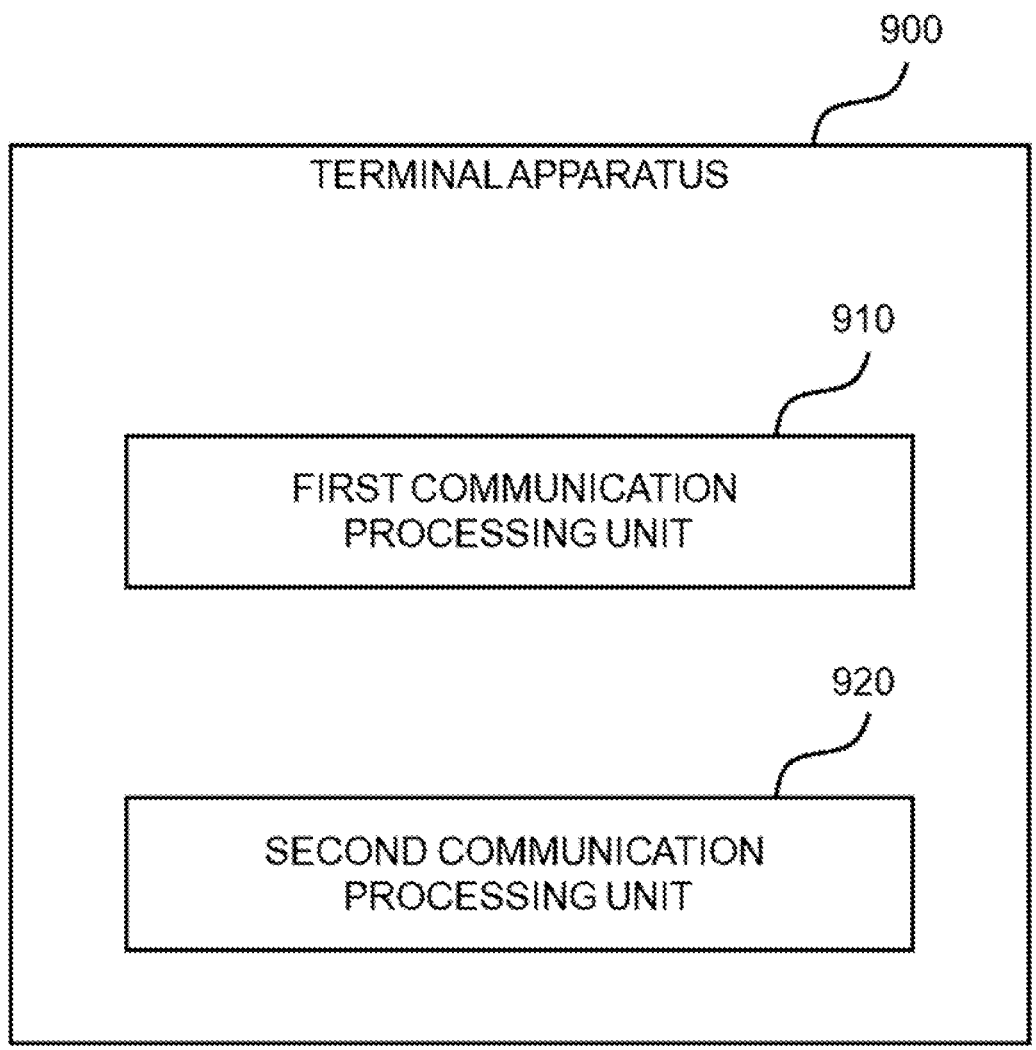
FIG. 21 is a block diagram illustrating an example of a schematic configuration of a terminal apparatus according to the third example embodiment.

With reference to FIG. 19 to FIG. 21, a third example embodiment of the present invention will be described. The first example embodiment and the second example embodiment described above are concrete example embodiments, whereas the third example embodiment is a more generalized example embodiment.

<7.1. Configuration of First Communication Apparatus>

FIG. 19 is a block diagram illustrating an example of a schematic configuration of a first communication apparatus 700 according to the third example embodiment. With reference to FIG. 19, the first communication apparatus 700 includes an information obtaining unit 710 and a communication processing unit 720. Concrete operations of the information obtaining unit 710 and the communication processing unit 720 will be described later.

The information obtaining unit 710 and the communication processing unit 720 may be implemented with one or more processors such as a baseband (BB) processor and/or a different kind of processor and a memory (for example, a nonvolatile memory and/or a volatile memory) and/or a hard disk. The memory may be included in the one or more processors, or may be provided outside the one or more processors.

The first communication apparatus 700 may include a memory configured to store a program (instructions) and one or more processors that can execute the program (instructions). The one or more processors may execute the program and thereby perform operations of the information obtaining unit 710 and the communication processing unit 720. The program may be a program for causing the processor(s) to perform the operations of the information obtaining unit 710 and the communication processing unit 720.

Note that the first communication apparatus 700 may be virtual. In other words, the first communication apparatus 700 may be implemented as a virtual machine. In this case, the first communication apparatus 700 (the virtual machine) may operate as a physical machine (hardware) including a processor, a memory, and the like, and a virtual machine on a hypervisor.

<7.2. Configuration of Second Communication Apparatus>

FIG. 20 is a block diagram illustrating an example of a schematic configuration of a second communication apparatus 800 according to the third example embodiment. With reference to FIG. 20, the second communication apparatus 800 includes a communication processing unit 810. Concrete operations of the communication processing unit 810 will be described later.

The communication processing unit 810 may be implemented with one or more processors such as a baseband (BB) processor and/or a different kind of processor and a memory (for example, a nonvolatile memory and/or a volatile memory) and/or a hard disk. The memory may be included in the one or more processors, or may be provided outside the one or more processors.

The second communication apparatus 800 may include a memory configured to store a program (instructions) and one or more processors that can execute the program (instructions). The one or more processors may execute the program and thereby perform operations of the communication processing unit 810. The program may be a program for causing the processor(s) to perform the operations of the communication processing unit 810.

Note that the second communication apparatus 800 may be virtual. In other words, the second communication apparatus 800 may be implemented as a virtual machine. In this case, the second communication apparatus 800 (the virtual machine) may operate as a physical machine (hardware) including a processor, a memory, and the like, and a virtual machine on a hypervisor.

<7.3. Configuration of Terminal Apparatus>

FIG. 21 is a block diagram illustrating an example of a schematic configuration of a terminal apparatus 900 according to the third example embodiment. With reference to FIG. 21, the terminal apparatus 900 includes a first communication processing unit 910 and a second communication processing unit 920. Concrete operations of the first communication processing unit 910 and the second communication processing unit 920 will be described later.

The first communication processing unit 910 and the second communication processing unit 920 may be implemented with one or more processors such as a baseband (BB) processor and/or a different kind of processor and a memory (for example, a nonvolatile memory and/or a volatile memory) and/or a hard disk. The memory may be included in the one or more processors, or may be provided outside the one or more processors.

The terminal apparatus 900 may include a memory configured to store a program (instructions) and one or more processors that can execute the program (instructions). The one or more processors may execute the program and thereby perform operations of the first communication processing unit 910 and the second communication processing unit 920. The program may be a program for causing the processor(s) to perform operations of the first communication processing unit 910 and the second communication processing unit 920.

<7.4. Technical Features>

An example of technical features according to the third example embodiment will be described.

The first communication apparatus 700 (information obtaining unit 710) obtains data volume information indicating the volume of data transmitted between the first base station operating as a secondary node of dual connectivity using at least NR for the terminal apparatus 900 and the terminal apparatus 900. The first communication apparatus 700 (communication processing unit 720) transmits the data volume information to the second base station operating as a master node of the dual connectivity for the terminal apparatus 900.

In particular, the volume of the data is data volume counted in the PDCP layer or between the PDCP layer and the RLC layer.

For example, the first communication apparatus 700 is the first base station, or a central unit (CU) included in the first base station. In one example, the first communication apparatus 700 is the first base station 100 or the CU 200 of the first example embodiment or the second example embodiment, and the information obtaining unit 710 and the communication processing unit 720 are the information obtaining unit 247 and the second communication processing unit 243, respectively.

The second communication apparatus 800 (communication processing unit 810) receives the data volume information from the first base station.

For example, the second communication apparatus 800 is the second base station, or a CU included in the second base station. In one example, the second communication apparatus 800 is the second base station 400 or the CU of the second base station 400 of the first example embodiment or the second example embodiment, and the communication processing unit 810 is the second communication processing unit 443.

The terminal apparatus 900 (first communication processing unit 910) communicates with the first base station. The terminal apparatus 900 (second communication processing unit 920) communicates with the second base station.

In one example, the terminal apparatus 900 is the terminal apparatus 500 of the first example embodiment or the second example embodiment, and the first communication processing unit 910 and the second communication processing unit 920 are the first communication processing unit 541 and the second communication processing unit 543, respectively.

Note that the third example embodiment is not limited to the example described above.

Descriptions have been given above of the example embodiments of the present invention. However, the present invention is not limited to these example embodiments. It should be understood by those of ordinary skill in the art that these example embodiments are merely examples and that various alterations are possible without departing from the scope and the spirit of the present invention.

For example, the steps in the processing described in the Specification may not necessarily be carried out in time series in the order described in the corresponding sequence diagram. For example, the steps in the processing may be carried out in an order different from that described in the corresponding sequence diagram or may be carried out in parallel. Some of the steps in the processing may be deleted, or more steps may be added to the processing.

An apparatus (one of a plurality of partial apparatuses constituting each node, or a module for the node or the partial apparatus) including a constituent element (for example, the communication processing unit, the counting unit, and/or the information obtaining unit) of each node (the first base station, the CU, the DU, the second base station, or the terminal apparatus) described in the Specification may be provided. Moreover, methods including processing of the constituent elements may be provided, and programs for causing a processor to execute processing of the constituent elements may be provided. Moreover, non-transitory computer readable recording media (non-transitory computer readable media) having recorded thereon the programs may be provided. It is apparent that such partial apparatuses, modules, methods, programs, and non-transitory computer readable recording media are also included in the present invention.

The whole or part of the example embodiments disclosed above can be described as, but not limited to, the following supplementary notes.

(Supplementary Note 1)

A communication apparatus comprising:
an information obtaining unit configured to obtain data volume information indicating volume of data transmitted between a first base station and a terminal apparatus, the first base station operating for the terminal apparatus as a secondary node of dual connectivity using at least New Radio (NR); and
a communication processing unit configured to transmit the data volume information to a second base station operating for the terminal apparatus as a master node of the dual connectivity;
wherein the volume of the data is data volume counted in a Packet Data Convergence Protocol (PDCP) layer or between the PDCP layer and a Radio Link Control (RLC) layer.

(Supplementary Note 2)

The communication apparatus according to Supplementary Note 1, wherein the data is first data transmitted between the first base station and the terminal apparatus through a radio bearer terminated at the secondary node.

(Supplementary Note 3)

The communication apparatus according to Supplementary Note 2, wherein the data does not include second data transmitted between the first base station and the terminal apparatus through a radio bearer terminated at a master node of the dual connectivity.

(Supplementary Note 4)

The communication apparatus according to Supplementary Note 3, wherein the volume of the first data is data volume counted by the secondary node, and the volume of the second data is data volume counted by the master node.

(Supplementary Note 5)

The communication apparatus according to Supplementary Note 1, wherein the data includes first data transmitted between the first base station and the terminal apparatus through a radio bearer terminated at the secondary node and second data transmitted between the first base station and the terminal apparatus through a radio bearer terminated at a master node of the dual connectivity, and the data volume information includes first data volume information indicating volume of the first data and second data volume information indicating volume of the second data.

(Supplementary Note 6)

The communication apparatus according to Supplementary Note 5, wherein the volume of the second data is data volume counted between the PDCP layer and the RLC layer.

(Supplementary Note 7)

The communication apparatus according to Supplementary Note 5 or 6, wherein the first base station includes a central unit executing PDCP layer processing and a distributed unit executing RLC layer processing, the second data is transmitted between the second base station operating as the master node and the distributed unit via the central unit, and the volume of the second data is data volume counted in the central node.

(Supplementary Note 8)
The communication apparatus according to any one of Supplementary Notes 2 to 7, wherein
the radio bearer terminated at the secondary node is an SN Terminated bearer, and
the first data is data transmitted between the first base station and the terminal apparatus through a Split bearer and an SCG bearer being respectively in the SN Terminated bearer.

(Supplementary Note 9)
The communication apparatus according to any one of Supplementary Notes 3 to 7, wherein
the radio bearer terminated at the master node is an MN Terminated bearer, and
the second data is data transmitted between the first base station and the terminal apparatus through a Split bearer and an SCG bearer being respectively in the MN Terminated bearer.

(Supplementary Note 10)
The communication apparatus according to any one of Supplementary Notes 1 to 9, further comprising a counting unit configured to count the volume of the data.

(Supplementary Note 11)
The communication apparatus according to Supplementary Note 10, wherein
the data includes downlink data transmitted from the first base station to the terminal apparatus and uplink data transmitted from the terminal apparatus to the first base station, and
the counting unit is configured to count volume of the downlink data based on a status of delivery of the downlink data to the terminal apparatus.

(Supplementary Note 12)
The communication apparatus according to Supplementary Note 11, wherein the status of the delivery is a delivery status confirmed in a layer lower than the PDCP layer.

(Supplementary Note 13)
The communication apparatus according to Supplementary Note 11 or 12, wherein
the first base station includes a central unit executing PDCP layer processing and a distributed unit executing RLC layer processing, and
the status of the delivery is information transmitted from the distributed unit to the central unit.

(Supplementary Note 14)
The communication apparatus according to any one of Supplementary Notes 11 to 13, wherein the status of the delivery is indicated in a DL DATA DELIVERY STATUS frame.

(Supplementary Note 15)
The communication apparatus according to any one of Supplementary Notes 1 to 14, wherein the data volume information is Usage count UL and Usage count DL.

(Supplementary Note 16)
The communication apparatus according to any one of Supplementary Notes 1 to 15, wherein the communication processing unit is configured to transmit a Secondary RAT Data Usage Report message including the data volume information to the second base station.

(Supplementary Note 17)
The communication apparatus according to any one of Supplementary Notes 1 to 16, wherein the communication apparatus is the first base station.

(Supplementary Note 18)
The communication apparatus according to any one of Supplementary Notes 1 to 16, wherein
the first base station includes a central unit executing PDCP layer processing and a distributed unit executing RLC layer processing, and
the communication apparatus is the central unit.

(Supplementary Note 19)
The communication apparatus according to any one of Supplementary Notes 1 to 18, wherein the dual connectivity is dual connectivity using NR and Long Term Evolution (LTE).

(Supplementary Note 20)
The communication apparatus according to Supplementary Note 19, wherein
the dual connectivity is E-UTRA-NR Dual Connectivity (EN-DC), and
the first base station is an en-gNB.

(Supplementary Note 21)
A communication apparatus comprising:
a communication processing unit configured to receive, from a first base station operating for a terminal apparatus as a secondary node of dual connectivity using at least New Radio (NR), data volume information indicating volume of data transmitted between the first base station and the terminal apparatus;
wherein the volume of the data is data volume counted in a Packet Data Convergence Protocol (PDCP) layer or between the PDCP layer and a Radio Link Control (RLC) layer.

(Supplementary Note 22)
The communication apparatus according to Supplementary Note 21,
wherein the data is first data transmitted between the first base station and the terminal apparatus through a radio bearer terminated at the secondary node, and
the communication apparatus further comprises a counting unit configured to count volume of second data transmitted between the first base station and the terminal apparatus through a radio bearer terminated at a master node of the dual connectivity.

(Supplementary Note 23)
A terminal apparatus comprising:
a first communication processing unit configured to communicate with a first base station operating for the terminal apparatus as a secondary node of dual connectivity using at least NR; and
a second communication processing unit configured to communicate with a second base station operating for the terminal apparatus as a master node of the dual connectivity;
wherein the first base station is configured to transmit data volume information indicating volume of data transmitted between the first base station and the terminal apparatus to the second base station, and
the volume of the data is data volume counted in a Packet Data Convergence Protocol (PDCP) layer or between the PDCP layer and a Radio Link Control (RLC) layer.

(Supplementary Note 24)
A method comprising:
obtaining data volume information indicating volume of data transmitted between a first base station and a terminal apparatus, the first base station operating for the terminal apparatus as a secondary node of dual connectivity using at least New Radio (NR); and
transmitting the data volume information to a second base station operating for the terminal apparatus as a master node of the dual connectivity;

wherein the volume of the data is data volume counted in a Packet Data Convergence Protocol (PDCP) layer or between the PDCP layer and a Radio Link Control (RLC) layer.

(Supplementary Note 25)

A program that causes a processor to execute:

obtaining data volume information indicating volume of data transmitted between a first base station and a terminal apparatus, the first base station operating for the terminal apparatus as a secondary node of dual connectivity using at least New Radio (NR); and transmitting the data volume information to a second base station operating for the terminal apparatus as a master node of the dual connectivity;

wherein the volume of the data is data volume counted in a Packet Data Convergence Protocol (PDCP) layer or between the PDCP layer and a Radio Link Control (RLC) layer.

(Supplementary Note 26)

A non-transitory computer readable recording medium storing a program that causes a processor to execute:

obtaining data volume information indicating volume of data transmitted between a first base station and a terminal apparatus, the first base station operating for the terminal apparatus as a secondary node of dual connectivity using at least New Radio (NR); and transmitting the data volume information to a second base station operating for the terminal apparatus as a master node of the dual connectivity;

wherein the volume of the data is data volume counted in a Packet Data Convergence Protocol (PDCP) layer or between the PDCP layer and a Radio Link Control (RLC) layer.

(Supplementary Note 27)

A method comprising:

receiving, from a first base station operating for a terminal apparatus as a secondary node of dual connectivity using at least New Radio (NR), data volume information indicating volume of data transmitted between the first base station and the terminal apparatus;

wherein the volume of the data is data volume counted in a Packet Data Convergence Protocol (PDCP) layer or between the PDCP layer and a Radio Link Control (RLC) layer.

(Supplementary Note 28)

A program that causes a processor to execute:

receiving, from a first base station operating for a terminal apparatus as a secondary node of dual connectivity using at least New Radio (NR), data volume information indicating volume of data transmitted between the first base station and the terminal apparatus;

wherein the volume of the data is data volume counted in a Packet Data Convergence Protocol (PDCP) layer or between the PDCP layer and a Radio Link Control (RLC) layer.

(Supplementary Note 29)

A non-transitory computer readable recording medium storing a program that causes a processor to execute:

receiving, from a first base station operating for a terminal apparatus as a secondary node of dual connectivity using at least New Radio (NR), data volume information indicating volume of data transmitted between the first base station and the terminal apparatus;

wherein the volume of the data is data volume counted in a Packet Data Convergence Protocol (PDCP) layer or between the PDCP layer and a Radio Link Control (RLC) layer.

(Supplementary Note 30)

A method comprising:

communicating with a first base station operating for a terminal apparatus as a secondary node of dual connectivity using at least NR; and communicating with a second base station operating for the terminal apparatus as a master node of the dual connectivity;

wherein the first base station is configured to transmit data volume information indicating volume of data transmitted between the first base station and the terminal apparatus to the second base station, and the volume of the data is data volume counted in a Packet Data Convergence Protocol (PDCP) layer or between the PDCP layer and a Radio Link Control (RLC) layer.

(Supplementary Note 31)

A program that causes a processor to execute:

communicating with a first base station operating for a terminal apparatus as a secondary node of dual connectivity using at least NR; and communicating with a second base station operating for the terminal apparatus as a master node of the dual connectivity;

wherein the first base station is configured to transmit data volume information indicating volume of data transmitted between the first base station and the terminal apparatus to the second base station, and the volume of the data is data volume counted in a Packet Data Convergence Protocol (PDCP) layer or between the PDCP layer and a Radio Link Control (RLC) layer.

(Supplementary Note 32)

A non-transitory computer readable recording medium storing a program that causes a processor to execute:

communicating with a first base station operating for a terminal apparatus as a secondary node of dual connectivity using at least NR; and communicating with a second base station operating for the terminal apparatus as a master node of the dual connectivity;

wherein the first base station is configured to transmit data volume information indicating volume of data transmitted between the first base station and the terminal apparatus to the second base station, and the volume of the data is data volume counted in a Packet Data Convergence Protocol (PDCP) layer or between the PDCP layer and a Radio Link Control (RLC) layer.

This application claims priority based on JP 2018-023332 filed on Feb. 13, 2018, the entire disclosure of which is incorporated herein.

INDUSTRIAL APPLICABILITY

In a mobile communication system, a secondary node (SN) can report data volume to a master node (MN) in dual connectivity.

REFERENCE SIGNS LIST

| | |
|---|---|
| 1 | System |
| 100 | First base station |
| 200 | Central unit (CU) |
| 241 | First communication processing unit |
| 243 | Second communication processing unit |
| 245 | Counting unit |
| 247 | Information obtaining unit |

| | |
|---|---|
| 300 | Distributed unit (DU) |
| 341 | First communication processing unit |
| 343 | Second communication processing unit |
| 400 | Second base station |
| 441 | First communication processing unit |
| 443 | Second communication processing unit |
| 445 | Counting unit |
| 500 | Terminal apparatus |
| 541 | First communication processing unit |
| 543 | Second communication processing unit |

What is claimed is:

1. A first base station being a secondary node of dual connectivity comprising:
 at least one memory; and
 at least one processor configured to:
  host PDCP (Packet Data Convergence Protocol) layer,
  count volume of data transmitted between UE (User Equipment) and the first base station through an SN-terminated MCG bearer, and
  send a SECONDARY RAT DATA USAGE REPORT message to a second base station being a master node of the dual connectivity,
  wherein the SECONDARY RAT DATA USAGE REPORT message includes a first information element indicating the volume of data counted by the first base station, and
  wherein the SECONDARY RAT DATA USAGE REPORT message is sent to a core network by including a second information element indicating volume of data transmitted through an MN-terminated bearer.

2. The first base station according to claim 1, wherein
 the first base station counts volume of data transmitted through the SN-terminated MCG bearer and volume of data transmitted through the MN-terminated bearer, and
 the SECONDARY RAT DATA USAGE REPORT message includes the first information element and the second information element indicating the volume of data transmitted through the MN-terminated bearer.

3. The first base station according to claim 2, wherein the volume of data transmitted through the MN-terminated bearer is counted between the PDCP layer and a RLC (Radio Link Control) layer.

4. The first base station according to claim 3, wherein
 the first base station further comprises:
  central unit processing the PDCP layer, and
  distributed unit processing the RLC layer,
 the volume of data transmitted through the MN-terminated bearer is transmitted between the second base station and the distributed unit via the central unit, and
 the volume of data transmitted through the SN-terminated MCG bearer is counted at the central unit.

5. The first base station according to claim 1, wherein the data transmitted through the SN-terminated MCG bearer is transmitted through a Split bearer or an SCG bearer of an SN-terminated bearer.

6. The first base station according to claim 1, wherein the data transmitted through the MN-terminated bearer is transmitted through a Split bearer or an SCG bearer of the MN-terminated bearer.

7. The first base station according to claim 1, wherein
 the data transmitted through the SN-terminated MCG bearer includes downlink data sent from the first base station to the UE, and uplink data sent from UE to the first base station, and
 the count unit counts a volume of the downlink data based on condition of delivery of the downlink data.

8. The first base station according to claim 7, wherein the condition of delivery is confirmed at a lower layer than the PDCP layer.

9. The first base station according to claim 8, wherein
 the first base station further comprises:
  central unit processing the PDCP layer, and
  distributed unit processing RLC layer,
 the condition of delivery is information sent from the distributed unit to the central unit.

10. The first base station according to claim 9, wherein the condition of delivery is DL DATA DELIVERY STATUS frame.

11. The first base station according to claim 1, wherein the first information element and the second information element are Usage count UL and Usage count DL.

12. The first base station according to claim 1, wherein the dual connectivity uses NR and LTE (Long Term Evolution).

13. The first base station according to claim 12, wherein
 the dual connectivity is EN-DC (E-UTRA-NR Dual Connectivity), and
 the first base station is en-gNB.

14. A method comprising:
 counting volume of data transmitted through an SN-terminated MCG bearer, between a first base station being a secondary node of dual connectivity and UE (User Equipment), and
 sending a SECONDARY RAT DATA USAGE REPORT message to a second base station being a master node of the dual connectivity,
 wherein the SECONDARY RAT DATA USAGE REPORT message includes a first information element indicating the volume of data counted by the first base station, and
 wherein the SECONDARY RAT DATA USAGE REPORT message is sent to a core network by including a second information element indicating volume of data transmitted through an MN-terminated bearer.

15. A method comprising:
 receiving, from a first base station being a secondary node of dual connectivity, a SECONDARY RAT DATA USAGE REPORT message including a first information element indicating volume of data counted by the first base station transmitted through an SN-terminated MCG bearer, between the first base station and UE (User Equipment);
 including in the SECONDARY RAT DATA USAGE REPORT message, a second information element indicating volume of data transmitted through an MN-terminated bearer; and
 send the SECONDARY RAT DATA USAGE REPORT message to a core network,
 wherein the first base station hosts PDCP (Packet Data Convergence Protocol) layer and counts the volume of data transmitted through the SN-terminated MCG bearer between the first base station and the UE.

16. The first base station according to claim 1, wherein the first information element indicates the volume of data for each QoS flow.

* * * * *